(12) United States Patent
Cho et al.

(10) Patent No.: US 9,365,694 B2
(45) Date of Patent: *Jun. 14, 2016

(54) COMPOSITION INCLUDING POLYIMIDE BLOCK COPOLYMER AND INORGANIC PARTICLES, METHOD OF PREPARING SAME, ARTICLE INCLUDING SAME, AND DISPLAY DEVICE INCLUDING THE ARTICLE

(71) Applicant: SAMSUNG ELECTRONICS CO., LTD., Suwon-si, Gyeonggi-do (KR)

(72) Inventors: Chung Kun Cho, Suwon-si (KR); Mikhail Kovalev, Suwon-si (KR); Fedosya Kalinina, Hwaseong-si (KR); Dmitry Androsov, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,114

(22) Filed: Jul. 26, 2013

(65) Prior Publication Data

US 2014/0031499 A1 Jan. 30, 2014

(30) Foreign Application Priority Data

Jul. 27, 2012 (KR) ........................ 10-2012-0082468

(51) Int. Cl.
| | | |
|---|---|---|
| C08G 59/00 | (2006.01) | |
| C08G 65/00 | (2006.01) | |
| C08G 73/00 | (2006.01) | |
| C08G 77/00 | (2006.01) | |
| C08K 3/36 | (2006.01) | |
| C08G 73/10 | (2006.01) | |
| C08G 73/14 | (2006.01) | |
| C08L 79/08 | (2006.01) | |
| C08K 3/22 | (2006.01) | |

(52) U.S. Cl.
CPC .............. *C08K 3/36* (2013.01); *C08G 73/1067* (2013.01); *C08G 73/14* (2013.01); *C08K 3/22* (2013.01); *C08L 79/08* (2013.01)

(58) Field of Classification Search
None
See application file for complete search history.

(56) References Cited

U.S. PATENT DOCUMENTS

| | | | |
|---|---|---|---|
| 7,579,054 | B2 | 8/2009 | Akiyoshi et al. |
| 8,053,331 | B2 | 11/2011 | Gadkaree |
| 2002/0107335 | A1* | 8/2002 | Nishihata et al. .......... 525/418 |
| 2004/0180286 | A1 | 9/2004 | Nagoya et al. |
| 2010/0018756 | A1 | 1/2010 | Shimeno et al. |
| 2011/0070461 | A1 | 3/2011 | Yamada et al. |
| 2012/0183730 | A1* | 7/2012 | Nakayama et al. .......... 428/141 |
| 2012/0296050 | A1* | 11/2012 | Cho et al. .................... 525/436 |
| 2013/0202869 | A1* | 8/2013 | Cho et al. .................... 428/220 |

FOREIGN PATENT DOCUMENTS

| | | |
|---|---|---|
| CN | 1639229 A | 7/2005 |
| CN | 101501098 A | 8/2009 |
| CN | 101589089 A | 11/2009 |
| CN | 102602069 A | 7/2012 |
| EP | 2013/048126 * | 4/2013 |
| JP | 03-207717 A | 9/1991 |
| JP | 08-104749 A | 4/1996 |
| JP | 2005-187768 A | 7/2005 |
| JP | 2009-229507 A | 10/2009 |
| JP | 2010-180292 A | 8/2010 |
| KR | 1020030027249 A | 4/2003 |
| KR | 1020050072182 A | 7/2005 |
| WO | 2008/072495 A1 | 6/2008 |

OTHER PUBLICATIONS

The Extended European Search Report for European Patent Application No. 13178253.4 dated Apr. 17, 2014.
Chen et al., "Synthesis and Characterization of Polyimide/Silica Hybrid Composites", Chem. Mater., 1999, 11, pp. 1218-1222.
Gregory P. Crawford, "Flexible flat panel displays", New York, 2005.
Mittal KL. Polyimides and other high temperature polymers: synthesis, characterization, vol. 2. Utrecht: VSP:2003.
Chen et al., "Synthesis and Characterization of Polyimide/Silica Hybrid composites", Chem. Mater., 11, 1999, pp. 1218-1222.
Cheng et al, "Synthesis of New Soluble Aromatic Poly(annide imide)s from Unsymmetrical Extended Diamine Containing Phthalazinone Moiety", Journal of Applied Polymer Science, vol. 92, 2004, pp. 1516-1520.
Cheng et al, "Stress control for overlay registration in a-Si:H TFTs on flexible organic-polymer-foil substrates", Journal of the SID, 13/7, 2005, pp. 563-568.
Geffroy et al., "Organic light-emitting diode (OLED) technology: materials, devices and display technologies", Polymer International, 55, 2006, pp. 572-582.
Gu et al., "Vacuum-deposited, nonpolymeric flexible organic light-emitting devices", Optics Letters, vol. 22, No. 3, Feb. 1, 1997, pp. 172-174.
Hasegawa et al, "Photophysics, photochemistry, and optical properties of polyimides", Prog. Polym. Sci., 26, 2001, pp. 259-335.
Hedrick et al., "Polymeric Organic-Inorganic Hybrid Nanocomposites: Preparation of Polyimide-Modified Poly (silsesquioxane) Using Functionalized Poly (amic acid alkylester) Precursors", Macromolecules, 30, 1997, pp. 8512-8515.
Jeong et al., "Synthesis and characterization of novel polyimides containing fluorine and phosphine oxide moieties", Polymer, 42, 2001, pp. 6019-6030.

(Continued)

*Primary Examiner* — Ana Woodward
(74) *Attorney, Agent, or Firm* — Cantor Colburn LLP

(57) ABSTRACT

Disclosed is a polyimide composition including a copolymer including first and/or second repeating unit including an imide repeating unit, or an amic acid repeating unit to form an imide repeating unit through imidization, and a third repeating unit including an amid repeating unit, wherein at least one terminal end of the copolymer is substituted with a substituted or unsubstituted siloxane or silanol group; and an inorganic particle or a precursor thereof.

18 Claims, 8 Drawing Sheets

(56) References Cited

OTHER PUBLICATIONS

Jin et al., "Flexible AMOLED displays on stainless-steel foil", Journal of the SID, 14/12, 2006, pp. 1083-1090.
Krajewska et al., "Tetralactam-modified gold electrodes for amperometric detection of acrylic acid", Supramolecular Chemistry, vol. 21, No. 6, Sep. 2009, pp. 520-531.
Lee et al., "Synthesis of colorless imide hybrid nanocomposites using amine functionalized oligosiloxane nano-building clusters", Journal of Materials Chemistry, 16, 2006, pp. 1657-1664.
Liaw et al., "Synthesis and characterizaion of new highly organosoluble poly(etherimide)s derived from 1, 1-bis[4-(4-dicarboxyphenoxy)phenyl]-4-tert-butylcyclohexane dianhydride", Polymer, 42, 2001, pp. 7993-7998.
Liaw et al., "Synthesis and characterization of New Highly Organosoluble Poly(ether imide)s Bearing a Noncoplanar 2,2'-dimethyl-4'-biphenyl Unit and kink Diphenylmethylene Linkage", Chem. Mater. 13, 2001, pp. 1811-1816.
Liaw et al., "Novel Organosoluble Poly(amide-imide)s Derived from Kink Diamine Bis[4-(4-trimellitimidophenoxy)phenyl]-diphenylmethane. Synthesis and Characterization", Macromol. chem. Phys., 202, 2001, pp. 1483-1487.
Lim et al., "Flexible Organic Electroluminescent Devices Based on Fluorine-Containing colorless Polymide Substrates", Advanced Materials, vol. 14, No. 2, 2002, pp. 1275-1279.
Liou et al., "Synthesis and Evaluation of Photoluminescent and Electrochemical Properties of New Aromatic Polyamides and Polyimides with a kink 1, 2-Phenylenediamine Moiety", Journal of Polymer Science: Part A, Polymer Chemistry, vol. 44, 2006, pp. 2587-2603.
Long et al., "P-24: High-Temperature (250c) Amorphous-Silicon TFT's on Clear Plastic Substrates", SID 05 Digest, 2005, pp. 313-315.
Morikawa et al., "Preparation of New Polyimide-Silica Hybrid Materials via the Sol-Gel Process", J. Mater. Chem., 2(7), 1992, pp. 679-690.
Myung et al., "Synthesis and characterization of polyimides from novel 1-(3', 5'-bis(trifluoromethyl)benzene) pyromelliticdianhydride (6FPPMDA)", Polymer, 45, 2004, pp. 3185-3193.
Stewart et al., "Polysilicon TFT Technology for Active Matrix OLED", IEEE Transactions on Electron Devices, vol. 48, No. 5, May 2001, pp. 845-851.
Tang et al., "Organic Electroluminescent Diodes", Electroluminescent, vol. 38, 1989, pp. 356-357.
Kane et al., "34.4: High Performance CMOS-on-Plastic Circuits using Sequential Laterally Solidified Silicon TFTs", SID 06 Digest, 2006, pp. 1365-1367.
Chinese Office Action dated Apr. 13, 2016, issued for the corresponding Chinese Patent Application No. 201310322675.3.

* cited by examiner

COMPOSITION INCLUDING POLYIMIDE BLOCK COPOLYMER AND INORGANIC PARTICLES, METHOD OF PREPARING SAME, ARTICLE INCLUDING SAME, AND DISPLAY DEVICE INCLUDING THE ARTICLE

CROSS-REFERENCE TO RELATED APPLICATION

This application claims priority to Korean Patent Application No. 10-2012-0082468, filed on Jul. 27, 2012, and all the benefits accruing therefrom under 35 U.S.C. §119, the content of which in its entirety, is herein incorporated by reference.

BACKGROUND

1. Field

This disclosure relates to a composition including a polyimide copolymer and an inorganic particle, an article including the same, and a display device including the article.

2. Description of the Related Art

A colorless transparent material has been researched for diverse purposes such as for an optical lens, a functional optical film, and a disk substrate. But as information devices are being further miniaturized and display devices are providing higher resolution, more functions and greater performance are required from the material.

Therefore, a colorless transparent material having excellent transparency, heat resistance, mechanical strength, and flexibility is continuously sought.

SUMMARY

An embodiment provides a composition including a polyimide copolymer and an inorganic particle having improved transparency, heat resistance, mechanical strength, and flexibility.

Another embodiment provides a composition including a poly(amide-imide) copolymer and an inorganic particle having improved transparency, heat resistance, mechanical strength, and flexibility.

Yet another embodiment provides an article including the composition including a polyimide copolymer and an inorganic particle, or the composition including a poly(amide-imide) copolymer and an inorganic particle.

Still another embodiment provides a display device including the article.

According to an embodiment, provided is a composition including a copolymer including at least one of a first repeating unit including an imide repeating unit represented by the following Chemical Formula 3, and/or an amic acid repeating unit to form the imide of the Chemical Formula 3 through imidization, and a second repeating unit including an imide repeating unit represented by the following Chemical Formula 4, and/or an amic acid repeating unit to form the imide of the Chemical Formula 4 through imidization; and a third repeating unit including a repeating unit represented by the following Chemical Formula 1, and/or a repeating unit represented by the following Chemical Formula 2, wherein at least one terminal end of the copolymer is substituted with a substituted or unsubstituted siloxane or silanol group; and an inorganic particle or a precursor thereof.

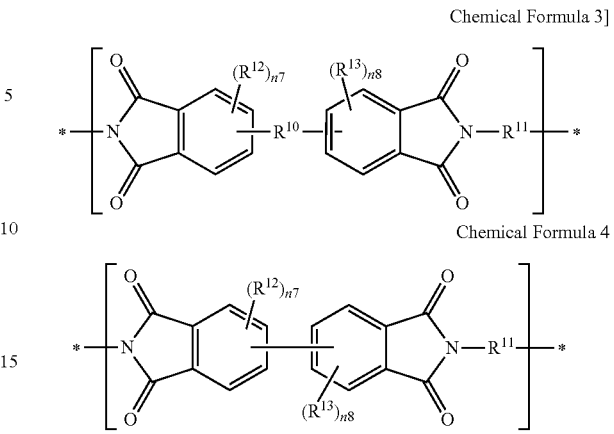

In Chemical Formula 3 or 4, $R^{10}$ is the same or different in each repeating unit, and is independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{11}$ is the same or different in each repeating unit, and independently includes a substituted or unsubstituted C6 to C30 aromatic organic group, wherein the aromatic organic group is one aromatic ring, two or more aromatic rings fused together to provide a condensed ring system, or two or more moieties independently selected from the foregoing linked through a single bond or through a functional group selected from, a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH, $R^{12}$ and $R^{13}$ are the same or different, and are independently a halogen, a hydroxy group, a substituted or unsubstituted C1 to C10 aliphatic organic group, a C6 to C20 aromatic organic group, an ether group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are independently hydrogen or a C1 to C10 aliphatic organic group, and n7 and n8 are each independently integers ranging from 0 to 3.

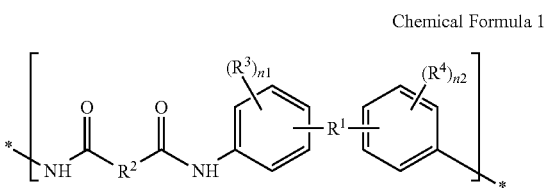

In Chemical Formula 1, $R^1$ is the same or different in each repeating unit, and is independently a substituted or unsubstituted C3 to C30 alicyclic organic group, a substituted or unsubstituted C6 to C30 aromatic organic group, or a substituted or unsubstituted C2 to C30 heterocyclic group, $R^2$ is the same or different in each repeating unit, and is independently a substituted or unsubstituted C6 to C30 aromatic organic group, $R^3$ and $R^4$ are the same or different and are independently a halogen, a hydroxy group, a substituted or unsubstituted C1 to C10 aliphatic organic group, a C6 to C20 aromatic organic group, an ether group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are independently hydrogen or a C1 to C10 aliphatic organic group, and n1 and n2 are independently integers ranging from 0 to 4.

Chemical Formula 2

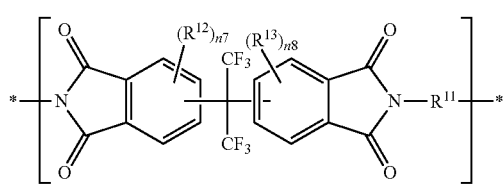

In Chemical Formula 2,

R$^5$ is the same or different in each repeating unit, and is independently a substituted or unsubstituted C6 to C30 aromatic organic group, R$^6$ and R$^7$ are the same or different and are independently an electron withdrawing group, R$^8$ and R$^9$ are the same or different, and are independently a halogen, a hydroxy group, a substituted or unsubstituted C1 to C10 aliphatic organic group, a C6 to C20 aromatic organic group, an ether group of formula —OR$^{204}$, wherein R$^{204}$ is a C1 to C10 aliphatic organic group, or a silyl group of formula —SiR$^{205}$R$^{206}$R$^{207}$, wherein R$^{205}$, R$^{206}$, and R$^{207}$ are the same or different, and are independently hydrogen, a C1 to C10 aliphatic organic group, n3 is an integer ranging from 1 to 4, n5 is an integer ranging from 0 to 3, n3+n5 is an integer ranging from 1 to 4, n4 is an integer ranging from 1 to 4, n6 is an integer ranging from 0 to 3, and n4+n6 is an integer ranging from 1 to 4.

Particularly, the repeating unit represented by the above Chemical Formula 3 may include an imide repeating unit represented by the following Chemical Formula 5, or an amic acid repeating unit to form the imide of the Chemical Formula 5 through imidization:

Chemical Formula 5

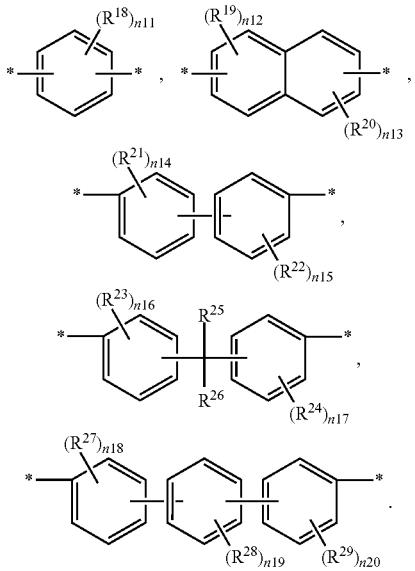

In Chemical Formula 5,

R$^{11}$, R$^{12}$, R$^{13}$, n7, and n8 are the same as described in the above Chemical Formula 3.

Particularly, in Chemical Formula 1, the R$^1$ may be selected from the following chemical formulae.

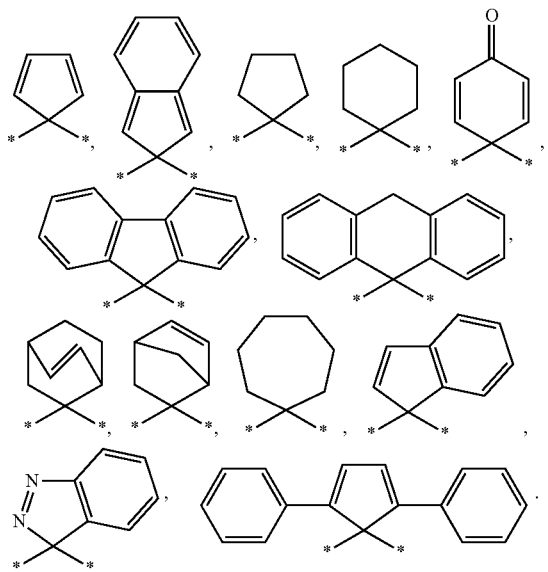

Particularly, in Chemical Formula 2, the R$^6$ and R$^7$ may be the same or different, and may be independently —CF$_3$, —CCl$_3$, —CBr$_3$, —Cl$_3$, —F, —Cl, —Br, —I, —NO$_2$, —CN, —COCH$_3$, or —CO$_2$C$_2$H$_5$.

Particularly, in above Chemical Formulae 1 and 2, R$^2$ and R$^5$ may be the same or different and may be independently selected from the following chemical formulae.

In the above chemical formulae,

R$^{18}$ to R$^{29}$ are the same or different, and are independently deuterium, a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

More particularly, the R$^2$ and R$^5$ may be the same or different and may be independently selected from the following chemical formulae.

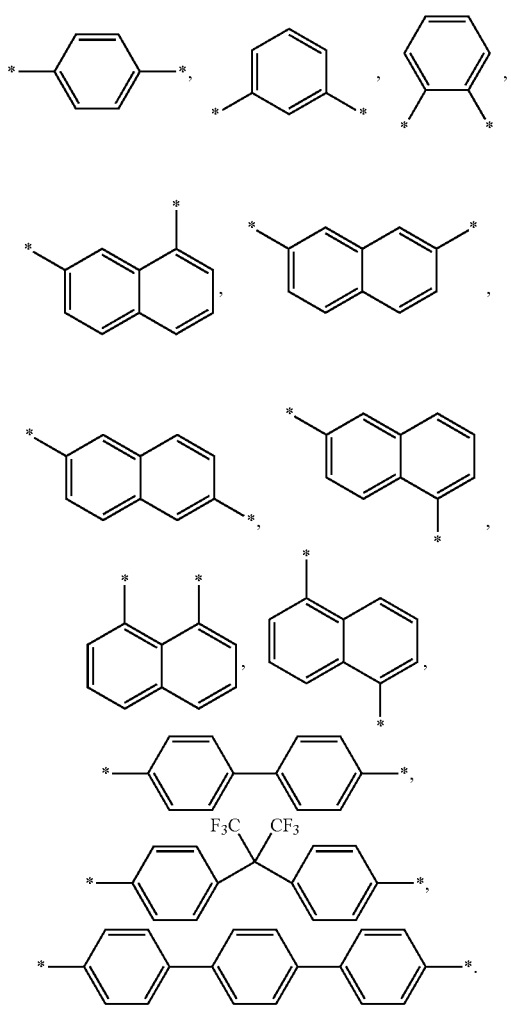

The third repeating unit may further include a repeating unit represented by the following Chemical Formula 6.

Chemical Formula 6

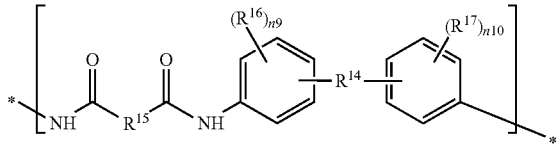

In Chemical Formula 6, $R^{14}$ is the same or different in each repeating unit, and independently includes O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group is one aromatic ring, two or more aromatic rings fused together to provide a condensed ring system, or two or more moieties independently selected from the foregoing linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{15}$ is the same or different in each repeating unit and is independently a substituted or unsubstituted C6 to C30 aromatic organic group, $R^{16}$ and $R^{17}$ are the same or different, and are independently a halogen, a hydroxy group, a substituted or unsubstituted C1 to C10 aliphatic organic group, a C6 to C20 aromatic organic group, an ether group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are independently hydrogen or a C1 to C10 aliphatic organic group, and n9 and n10 are each independently integers ranging from 0 to 4.

The copolymer, may include 1 to 1000 of the imide repeating unit represented by above Chemical Formula 3, and/or the amic acid repeating unit to form the imide of Chemical Formula 3 through imidization.

The polyimide may include 1 to 1000 of the imide repeating unit represented by above Chemical Formula 4, and/or the amic acid repeating unit to form the imide of Chemical Formula 4 through imidization.

The copolymer may have a weight average molecular weight of about 500 g/mol to about 200,000 g/mol.

The second repeating unit may have a weight average molecular weight of about 500 g/mol to about 50,000 g/mol.

In the copolymer, a total amount of the first repeating unit and a total amount of the second repeating unit may be present in a mole ratio of about 99:1 to about 1:99.

The copolymer may include 1 to 1000 of the third repeating units.

In the copolymer, a total amount of the first repeating units and/or the second repeating units, and a total amount of the third repeating unit may be present in a mole ratio of about 95:5 to about 5:95.

The repeating unit represented by Chemical Formula 1 may include repeating units represented by following Chemical Formula 7, 8 or 9, the repeating unit represented by Chemical Formula 2 may include repeating units represented by following Chemical Formula 10, 11 or 12, the repeating unit represented by above Chemical Formula 3 may include a repeating unit represented by the following Chemical Formula 13, the repeating unit represented by Chemical Formula 4 may include a repeating unit represented by the following Chemical Formula 14, and the repeating unit represented by Chemical Formula 6 may include repeating units represented by the following Chemical Formula 15, 16, or 17.

Chemical Formula 7

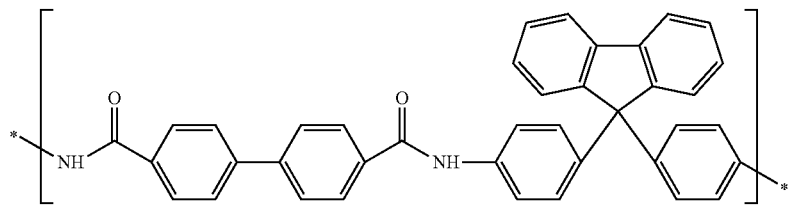

-continued

Chemical Formula 8
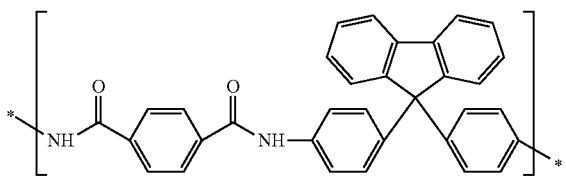

Chemical Formula 9
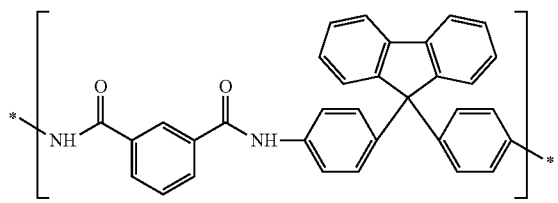

Chemical Formula 10
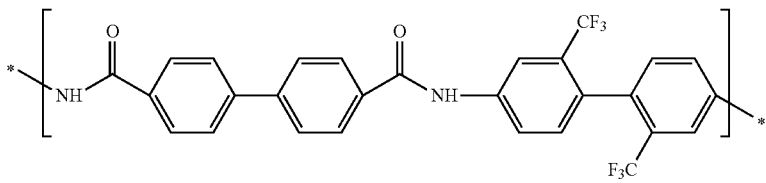

[Chemical Formula 12
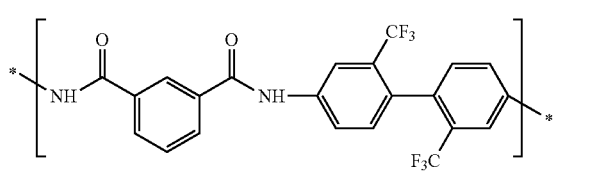

Chemical Formula 11
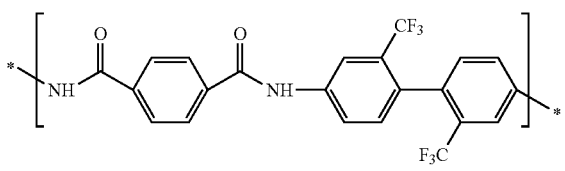

[Chemical Formula 13
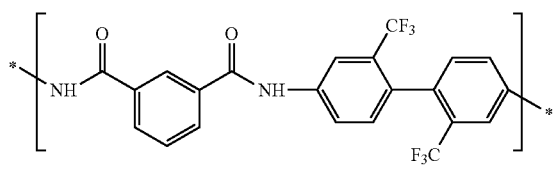

[Chemical Formula 14
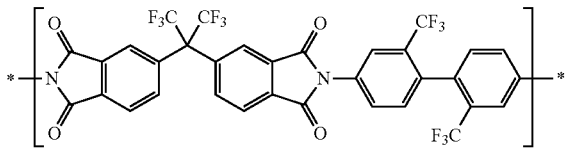

[Chemical Formula 15
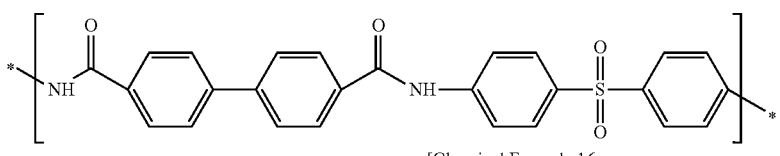

[Chemical Formula 16
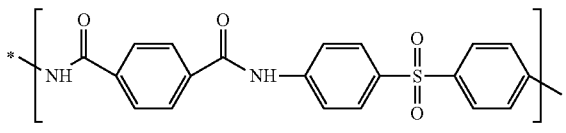

Chemical Formula 17

The copolymer may include the repeating units represented by Chemical Formula 10 above, the repeating units represented by Chemical Formula 13 above, and the repeating unit represented by Chemical Formula 14 above.

In the composition, the copolymer is substituted with a substituted or unsubstituted siloxane or silanol group at a terminal end of each copolymer.

The substituted or unsubstituted siloxane or silanol group substituting at least one terminal end of the copolymer may be a siloxane or silanol group represented by following Chemical Formula 20.

Chemical Formula 20
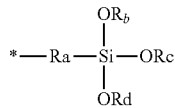

In Chemical Formula 20,

Ra is a substituted or unsubstituted C1 to C20 alkylene, a substituted or unsubstituted C2 to C20 alkenylene, a substituted or unsubstituted C2 to C20 alkynylene, a substituted or unsubstituted C3 to C20 cycloalkylene, a substituted or unsubstituted C3 to C20 cycloalkenylene, a substituted or unsubstituted C3 to C20 cycloalkynylene, a substituted or unsubstituted C6 to C18 arylene, or a substituted or unsubstituted C6 to C18 arylalkylene, and Rb to Rd are the same or different, and are independently hydrogen, a C1 to C20 alkyl, a C2 to C20 alkenyl, a C2 to C20 alkynyl, a C3 to C20 cycloalkyl, or a C6 to C18 aryl.

Particularly, the Chemical Formula 20 may be selected from the following chemical formulae.

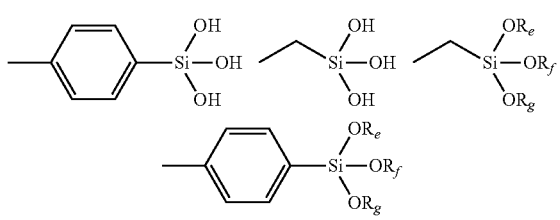

In the above chemical formulae, Re to Rg are the same or different, and are independently a C1 to C20 alkyl, a C2 to C20 alkenyl, a C2 to C20 alkynyl, a C3 to C20 cycloalkyl, or a C6 to C18 aryl.

The inorganic particle or a precursor thereof of the composition may be an oxide or hydroxide of at least one element selected from Ti, Si, Al, Zr, Sn, B, and Ce, or a precursor being capable of providing the oxide or hydroxide.

Particularly, the precursor compound being capable of providing the oxide or hydroxide of an element selected from Ti, Si, Al, Zr, Sn, B, or Ce may be an alkoxide, an ester, an acetylacetonate, or a halide of the element.

Particularly, the inorganic particle may be silica ($SiO_2$) or $TiO_2$.

A precursor of the silica may include an organic silica precursor or an inorganic silica precursor, and the organic silica precursor may be a compound represented by the following chemical formulae.

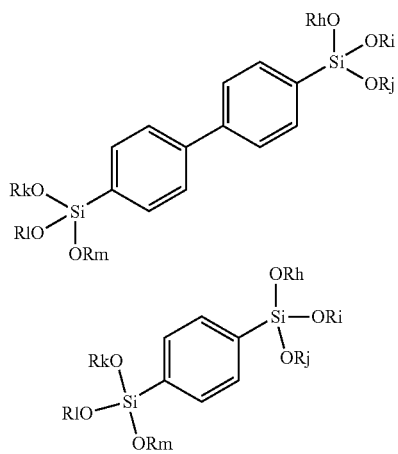

In the above chemical formulae,

Rh to Rm are the same or different, and are independently a C1 to C20 alkyl, a C2 to C20 alkenyl, a C2 to C20 alkynyl, a C3 to C20 cycloalkyl, or a C6 to C18 aryl.

The inorganic silica precursor may include TEOS (tetraethyl orthosilicate).

A precursor of $TiO_2$ may include titanium tetraisopropoxide.

The inorganic particle or precursor of inorganic particle may be included in an amount so that the inorganic particle is included in an amount of about 5 wt % to about 95 wt % based on the total amount of the copolymer. Specifically, the inorganic particle may be included in an amount of about 10 wt % to about 90 wt %, and more specifically about 15 wt % to about 80 wt % based on the total amount of the copolymer.

According to another embodiment, an article including the composition including a polyimide copolymer and an inorganic particle is provided.

Particularly, the article may be a film, a fiber, a coating material, or an adhesive.

The article may have total light transmittance of greater than or equal to about 70% in a wavelength range of 360 nm to 700 nm, and the article may have light transmittance of greater than or equal to about 55% for light of a 430 nm wavelength.

The article may have a coefficient of thermal expansion (CTE) of less than or equal to about 30 ppm/° C. or lower at a temperature of about 50° C. to about 400° C.

The article may have a haze of less than or equal to about 7%.

The article may have a yellowness index (YI) of less than or equal to about 20%.

The article may have a glass transition temperature (Tg) of greater than or equal to about 400° C.

According to yet another embodiment, a display device including the article is provided.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
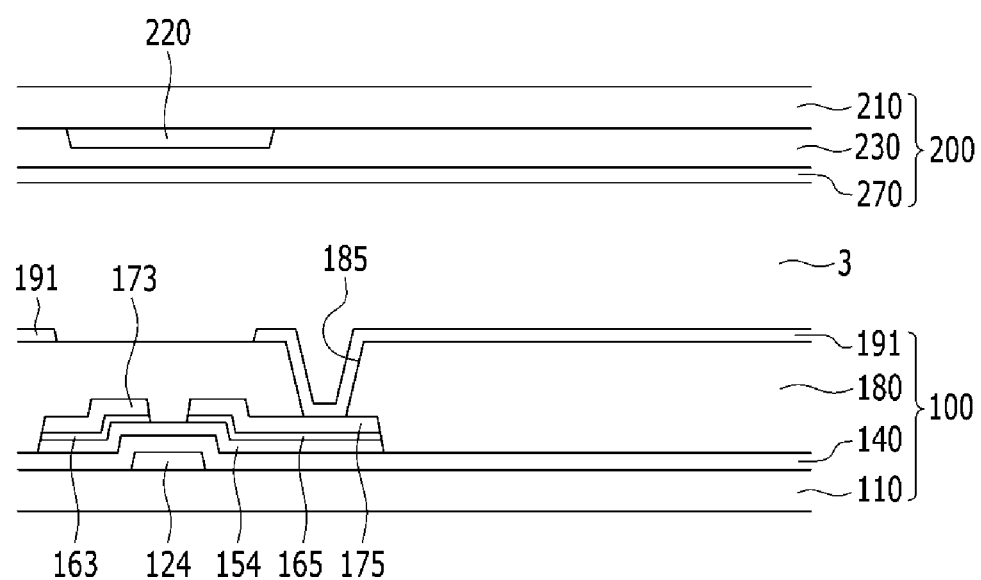
FIG. 1 is a cross-sectional view of a liquid crystal display (LCD) in accordance with an embodiment.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ ($R^{102}$), wherein $R^{100}$, $R^{101}$, and $R^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, when a specific definition is not otherwise provided, the term "alkyl group" refers to a C1 to C30 alkyl group, and specifically a C1 to C15 alkyl group, the term "cycloalkyl group" refers to a C3 to C30 cycloalkyl group, and specifically a C3 to C18 cycloalkyl group, the term "alkoxy group" refer to a C1 to C30 alkoxy group, and specifically a C1 to C18 alkoxy group, the term "ester group" refers to a C2 to C30 ester group, and specifically a C2 to C18 ester group, the term "ketone group" refers to a C2 to C30 ketone group, and specifically a C2 to C18 ketone group, the term "aryl group" refers to a C6 to C30 aryl group, and specifically a C6 to C18 aryl group, the term "alkenyl group" refers to a C2 to C30 alkenyl group, and specifically a C2 to C18 alkenyl group, the term "alkynyl group" refers to a C2 to C30 alkynyl group, and specifically a C2 to C18 alkynyl group, the term "alkylene group" refers to a C1 to C30 alkylene group, and specifically a C1 to C18 alkylene group, and the term "arylene group" refers to a C6 to C30 arylene group, and specifically a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, specifically a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, specifically a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), $S(=O)_2$, $Si(CH_3)_2$, $(CH_2)_p$ wherein $1 \leq p \leq 10$, $(CF_2)_q$ wherein $1 \leq q \leq 10$, $C(CH_3)_2$, $C(CF_3)_2$, and C(=O)NH, and specifically through $S(=O)_2$, for example an aryl group or a C6 to C30 arylene group, specifically a C6 to C16 aryl group or a C6 to C16 arylene group such as phenylene.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, specifically a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

In addition, in the specification, the mark "*" may refer to where a point of attachment to another atom.

According to one embodiment, provided is a composition including copolymer and an inorganic particle. In particular, the composition includes a copolymer including at least one of a first repeating unit including an imide repeating unit represented by the following Chemical Formula 3, and/or an amic acid repeating unit to form the imide of the Chemical Formula 3 through imidization, and a second repeating unit including an imide repeating unit represented by the following Chemical Formula 4, and/or an amic acid repeating unit to form the imide of the Chemical Formula 4 through imidization; and a third repeating unit including a repeating unit represented by the following Chemical Formula 1, and/or a repeating unit represented by the following Chemical Formula 2, wherein a terminal end of the copolymer is substituted with a substituted or unsubstituted siloxane or silanol group; and an inorganic particle or a precursor thereof.

Chemical Formula 3

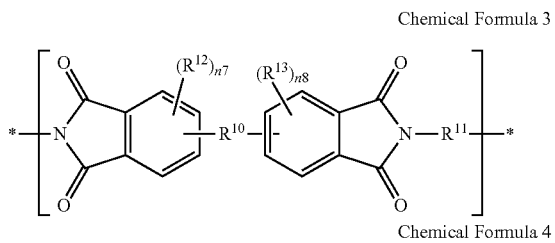

Chemical Formula 4

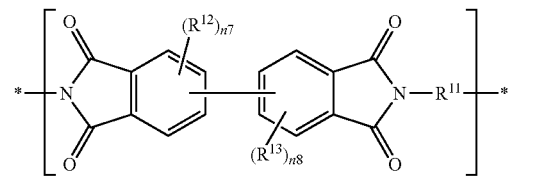

In Chemical Formulae 3 or 4, $R^{10}$ is the same or different in each repeating unit, and is independently a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, specifically a substituted or unsubstituted C1 to C10 aliphatic organic group, and more specifically —C(CF$_3$)$_2$—.

$R^{11}$ is the same or different in each repeating unit, and independently includes a substituted or unsubstituted C6 to C30 aromatic organic group, wherein the aromatic organic group is one aromatic ring, two or more aromatic rings fused together to provide a condensed ring system, or two or more moieties independently selected from the foregoing (i.e., a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, wherein at least one hydrogen of the aromatic organic group may be substituted with an electron withdrawing group. Herein, the electron withdrawing group may be —CF$_3$, —CCl$_3$, —CBr$_3$, —Cl$_3$, —F, —Cl, —Br, —I, —NO$_2$, —CN, —COCH$_3$, or —CO$_2$C$_2$H$_5$, but is not limited thereto.

$R^{12}$ and $R^{13}$ are the same or different, and are independently a halogen, a hydroxy group, a substituted or unsubstituted C1 to C10 aliphatic organic group, a C6 to C20 aromatic organic group, an ether group of formula —OR$^{208}$, wherein R$^{208}$ is a C1 to C10 aliphatic organic group, or a silyl group of formula —SiR$^{209}$R$^{210}$R$^{211}$, wherein R$^{209}$, R$^{210}$, and R$^{211}$ are the same or different, and are independently hydrogen, a C1 to C10 aliphatic organic group.

n7 and n8 are each independently integers ranging from 0 to 3.

Chemical Formula 1

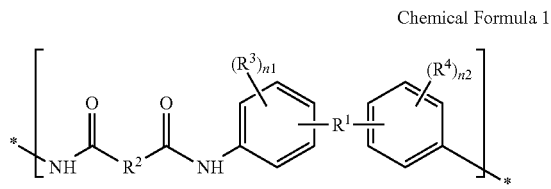

In Chemical Formula 1, $R^1$ is the same or different in each repeating unit, and is independently a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group.

$R^2$ is the same or different in each repeating unit, and is independently a substituted or unsubstituted C6 to C30 aromatic organic group, and specifically a phenylene group or a biphenylene group.

$R^3$ and $R^4$ are the same or different, and are independently a halogen, a hydroxy group, a substituted or unsubstituted C1 to C10 aliphatic organic group, a C6 to C20 aromatic organic group, and specifically hydrogen, an ether group of formula —OR$^{200}$, wherein R$^{200}$ is a C1 to C10 aliphatic organic group, or a silyl group of formula —SiR$^{201}$R$^{202}$R$^{203}$, wherein R$^{201}$, R$^{202}$, and R$^{203}$ are the same or different, and are independently hydrogen or a C1 to C10 aliphatic organic group.

n1 and n2 are independently integers ranging from 0 to 4.

Specifically, $R^1$ is the same or different in each repeating unit and is independently selected from the following chemical formulae, but is not limited thereto.

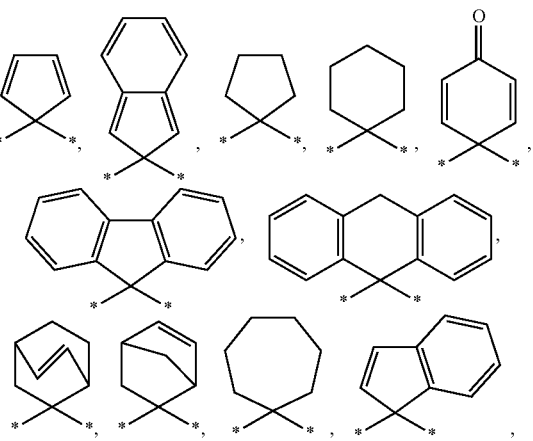

-continued

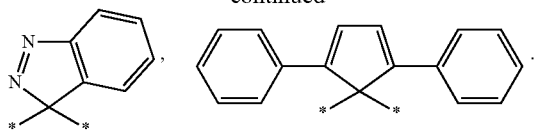

Specifically, $R^2$ is the same or different in each repeating unit and is independently selected from the following chemical formulae, but is not limited thereto.

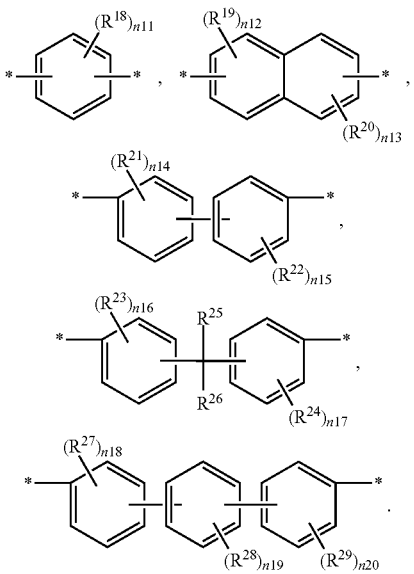

In the above chemical formulae, $R^{18}$ to $R^{29}$ are the same or different, and are independently deuterium, a halogen, a substituted or unsubstituted C1 to C10 aliphatic organic group, or a substituted or unsubstituted C6 to C20 aromatic organic group, n11 and n14 to n20 are independently integers ranging from 0 to 4, and n12 and n13 are independently integers ranging from 0 to 3.

More specifically, $R^2$ is the same or different and is independently selected from the following chemical formulae, but is not limited thereto.

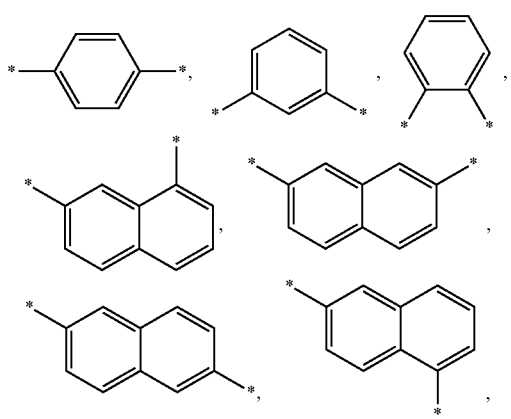

-continued

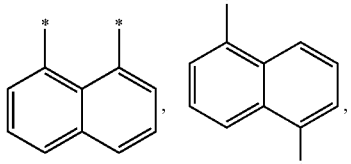

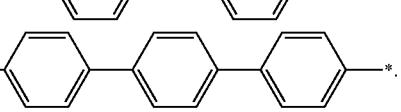

Chemical Formula 2

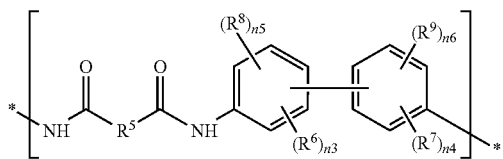

In Chemical Formula 2, $R^5$ is the same or different in each repeating unit and is independently a substituted or unsubstituted C6 to C30 aromatic organic group, and specifically a phenylene group or a biphenylene group.

$R^6$ and $R^7$ are the same or different, and are independently electron withdrawing groups.

$R^8$ and $R^9$ are the same or different, and are independently a halogen, a hydroxy group, a substituted or unsubstituted C1 to C10 aliphatic organic group, a C6 to C20 aromatic organic group, an ether group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$, and $R^{207}$ are the same or different, and are independently hydrogen, a C1 to C10 aliphatic organic group, n3 is an integer ranging from 1 to 4, n5 is an integer ranging from 0 to 3, n3+n5 is an integer ranging from 1 to 4, n4 is an integer ranging from 1 to 4, n6 is an integer ranging from 0 to 3, and n4+n6 is an integer ranging from 1 to 4.

Particularly, $R^5$ is the same or different, and is independently selected from the following chemical formulae, but is not limited thereto.

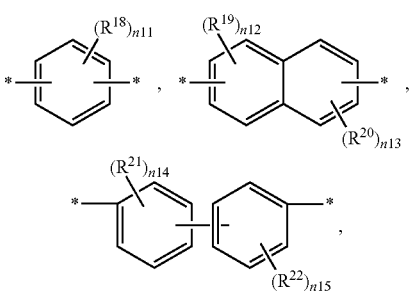

-continued

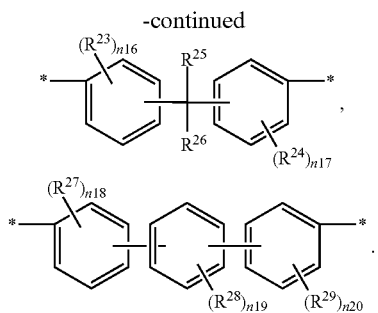

In the above chemical formulae,
$R^{18}$ to $R^{29}$ and n11 to n20 are the same as in the $R^2$.

Specifically, $R^6$ and $R^7$ are electron withdrawing groups, and the electron withdrawing groups may be —$CF_3$, —$CCl_3$, —$CBr_3$, —$CI_3$, —F, —Cl, —Br, —I, —$NO_2$, —CN, —$COCH_3$, or —$CO_2C_2H_5$, but are not limited thereto.

More specifically, $R^5$ may be the same or different and may be independently selected from the following chemical formulae.

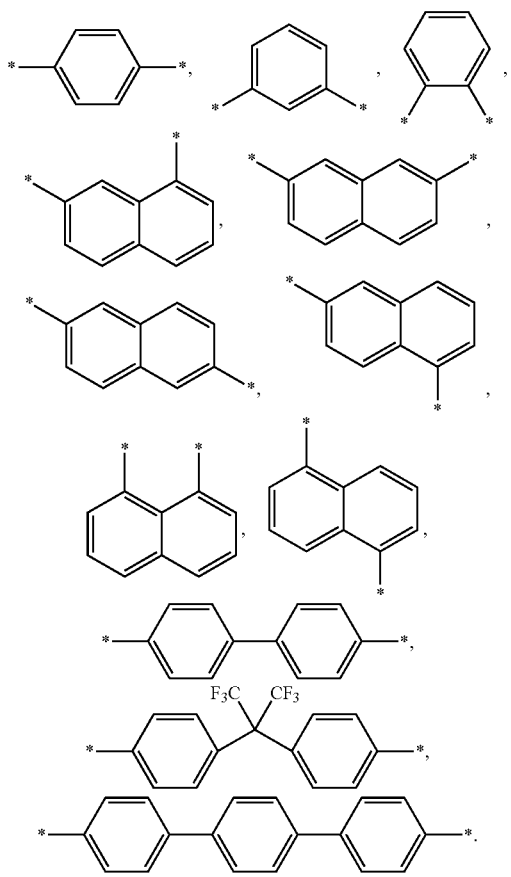

The third repeating unit including the repeating unit represented by Chemical Formula 1, the repeating unit represented by Chemical Formula 2, or a combination thereof is an amide that has excellent solvent solubility, workability, flexibility, and optical properties, and lowers a coefficient of thermal expansion. Therefore, the copolymer including the third repeating unit may have excellent optical properties, for example transparency, and excellent workability and flexibility, and may have a low coefficient of thermal expansion.

The copolymer may include 1 to 1000 of the repeating unit represented by Chemical Formula 1, the repeating unit represented by Chemical Formula 2, or a combination thereof. When the third repeating unit is included as of this amount, optical properties, workability, and flexibility of a poly (amide-imide) copolymer including the same may be improved. Specifically, the copolymer may include 1 to 100, and more specifically 1 to 20 repeating units represented by Chemical Formula 1, the repeating unit represented by Chemical Formula 2, or a combination thereof.

The third repeating unit may further include a repeating unit represented by following Chemical Formula 6:

Chemical Formula 6

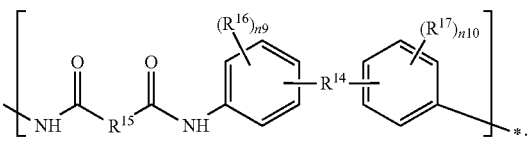

In Chemical Formula 6,
$R^{14}$ is the same or different in each repeating unit, and are independently O, S, C(=O), CH(OH), S(=O)$_2$, Si(CH$_3$)$_2$, (CH$_2$)$_p$ (wherein 1≤p≤10), (CF$_2$)$_q$ (wherein 1≤q≤10), C(CH$_3$)$_2$, C(CF$_3$)$_2$, C(=O)NH, or a substituted or unsubstituted C6 to C30 aromatic organic group, wherein the aromatic organic group is one aromatic ring, two or more aromatic rings fused together to provide a condensed ring system, or two or more moieties independently selected from the foregoing linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, and specifically through S(=O)$_2$.

$R^{15}$ is the same or different in each repeating unit, and are independently a substituted or unsubstituted C6 to C30 aromatic organic group, and specifically a phenylene group or a biphenylene group.

$R^{16}$ and $R^{17}$ are the same or different, and are independently a halogen, a hydroxy group, a substituted or unsubstituted C1 to C10 aliphatic organic group, a C6 to C20 aromatic organic group, an ether group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different and are independently hydrogen or a C1 to C10 aliphatic organic group, and n9 and n10 are each independently integers ranging from 0 to 4.

In the copolymer, when the third repeating unit further includes a repeating unit represented by above Chemical Formula 6, light transmittance may be improved.

The first repeating unit and the second repeating unit including the imide repeating unit represented by above Chemical Formula 3 or 4, or the amic acid repeating unit to form the imide of Chemical Formula 3 or 4 through imidization are imide s that have excellent heat resistance and mechanical strength, have good solvent resistance during article fabrication, and prevent crystals form being produced. Accordingly, the polyimide copolymer including the first and second repeating units may have excellent thermal properties and mechanical strength.

Each of the first repeating units may be the same or different, and each independently includes 1 to 1000 repeating units wherein each repeating unit is independently the imide repeating unit represented by above Chemical Formula 3, or the amic acid repeating unit to form the imide of Chemical Formula 3 through imidization.

Each of the second repeating units may be the same or different, and each independently includes 1 to 1000 repeating units wherein each repeating unit is independently the imide repeating unit represented by above Chemical Formula 4, or the amic acid repeating unit to form the imide of Chemical Formula 4 through imidization.

When the first and second repeating units are included of this size, thermal properties, mechanical strength, and optical properties of the polyimide copolymer may be improved. Specifically, the first and second repeating units are the same or different, and each independently includes 1 to 100, and more specifically 1 to 20 repeating units wherein each repeating unit is the imide repeating unit represented by above Chemical Formula 3 or 4, or the amic acid repeating unit to form the imide of Chemical Formula 3 or 4 through imidization.

The copolymer may each have a weight average molecular weight of about 500 g/mol to about 200,000 g/mol. When the copolymer has a weight average molecular weight within the above range, thermal properties, mechanical strength, and optical properties of the copolymer may be improved. Specifically, the copolymer may have a weight average molecular weight of about 5000 g/mol to about 100,000 g/mol.

The repeating unit represented by the above Chemical Formula 3 may include an imide repeating unit represented by following Chemical Formula 5, or an amic acid repeating unit to form the imide of Chemical Formula 5 through imidization a repeating unit.

Chemical Formula 5

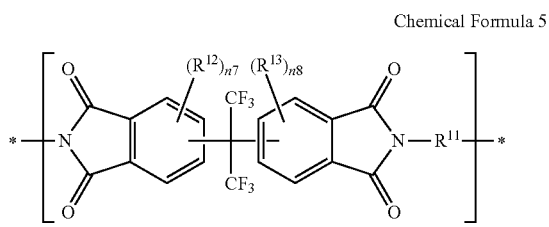

In Chemical Formula 5, $R^{11}$, $R^{12}$, $R^{13}$, n7, and n8 are the same as described in the above Chemical Formula 3.

When the repeating unit represented by Chemical Formula 3 includes a repeating unit represented by above Chemical Formula 5, a total amount of the repeating unit of the first repeating units and a total amount of the repeating unit of the second repeating units may be present in a mole ratio of about 99:1 to about 1:99 in the copolymer. Within the above range, the copolymer may have excellent heat resistance, mechanical strength, flexibility, and excellent optical properties, specifically light transmittance.

In the copolymer, a total amount of the first repeating unit and a total amount of the second repeating unit may be present in a mole ratio of about 99:1 to about 1:99.

The copolymer may 1 to 1000 of the repeating unit represented by Chemical Formula 1, the repeating unit represented by Chemical Formula 2, or a combination thereof, and the repeating unit of Chemical Formula 6.

In the copolymer a total amount of the first repeating unit and/or the second repeating unit and a total amount of the third repeating unit may be present in a mole ratio of about 95:5 to about 5:95, and specifically about 90:10 to about 10:90.

When the mole ratio and the total amount of the repeating units are within the above ranges, the copolymer may have excellent optical properties, heat resistance, mechanical strength, and flexibility.

The repeating unit represented by Chemical Formula 1 may include repeating units represented by the following Chemical Formulae 7, 8 or 9, the repeating unit represented by Chemical Formula 2 may include repeating units represented by the following Chemical Formulae 10, 11 or 12, the repeating unit represented by the above Chemical Formula 3 (or Chemical Formula 5) may include a repeating unit represented by the following Chemical Formula 13, the repeating unit represented by Chemical Formula 4 may include a repeating unit represented by the following Chemical Formula 14, and the repeating unit represented by Chemical Formula 6 may include repeating units represented by the following Chemical Formula 15, 16 or 17, but is not limited thereto.

Chemical Formula 7

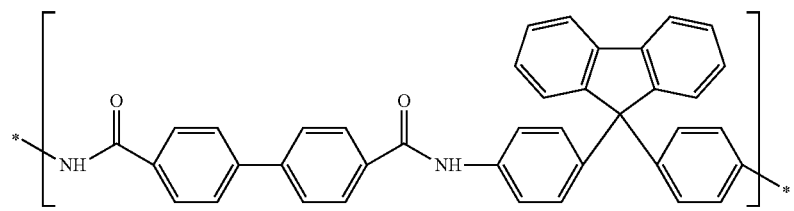

Chemical Formula 8

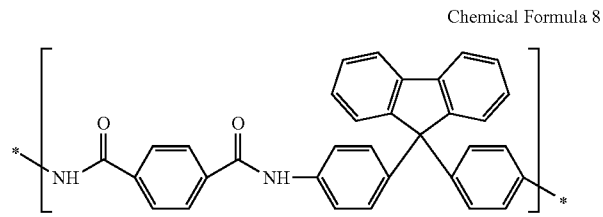

Chemical Formula 9

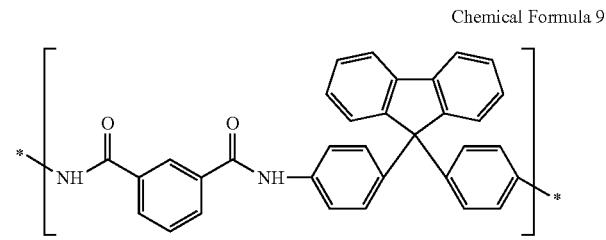

Chemical Formula 10

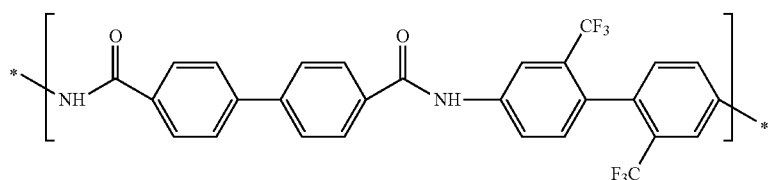

Chemical Formula 11

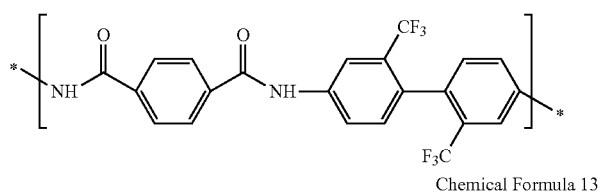

Chemical Formula 12

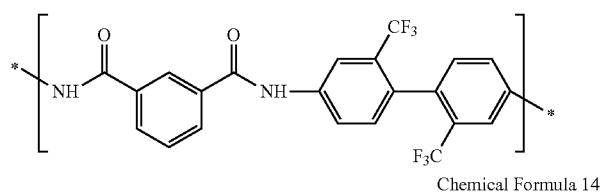

Chemical Formula 13

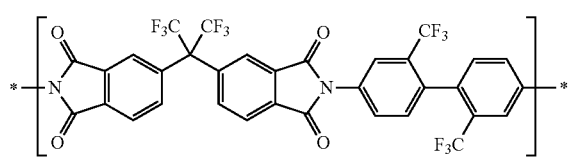

Chemical Formula 14

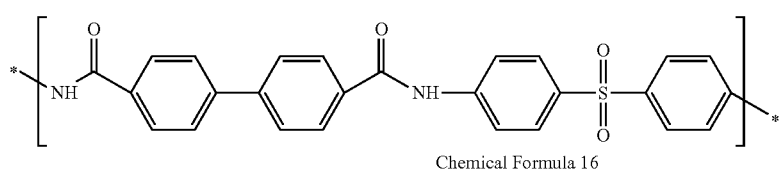

Chemical Formula 15

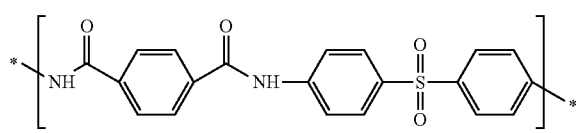

Chemical Formula 16

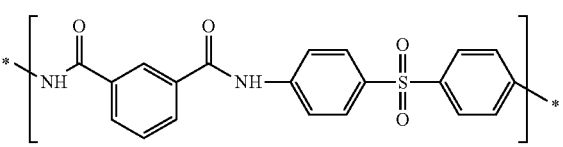

Chemical Formula 17

According to an embodiment, the composition includes the copolymer substituted with a substituted or unsubstituted siloxane or silanol group at least one terminal end thereof.

The substituted or unsubstituted siloxane or silanol group substituting at least one terminal end of the copolymer may be a siloxane or silanol group represented by following Chemical Formula 20:

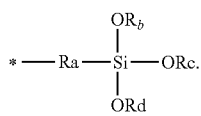

Chemical Formula 20

In Chemical Formula 20,

Ra is a substituted or unsubstituted C1 to C20 alkylene, a substituted or unsubstituted C2 to C20 alkenylene, a substituted or unsubstituted C2 to C20 alkynylene, a substituted or unsubstituted C3 to C20 cycloalkylene, a substituted or unsubstituted C3 to C20 cycloalkenylene, a substituted or unsubstituted C3 to C20 cycloalkynylene, a substituted or unsubstituted C6 to C18 arylene, or a substituted or unsubstituted C6 to C18 arylalkylene, and Rb to Rd are the same or different, and are independently hydrogen, a C1 to C20 alkyl, a C2 to C20 alkenyl, a C2 to C20 alkynyl, a C3 to C20 cycloalkyl, or a C6 to C18 aryl.

Particularly, the Chemical Formula 20 may be selected from following chemical formulae, but is not limited thereto:

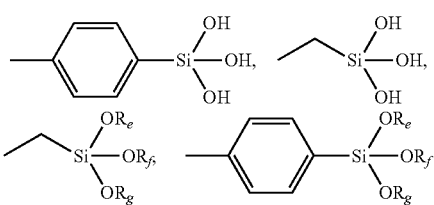

In the above chemical formulae, Re to Rg are the same or different, and are independently a C1 to C20 alkyl, a C2 to C20 alkenyl, a C2 to C20 alkynyl, a C3 to C20 cycloalkyl, or a C6 to C18 aryl.

As described below, when the copolymer is mixed with the inorganic particle or precursor of an inorganic particle to prepare a composition, the siloxane or silanol group substituting at least one terminal end of the copolymer binds to the inorganic particle or precursor of the inorganic particle, such that the inorganic particles or precursors of the inorganic particles can be well dispersed and can mix with the copolymer without aggregation, and thus the composition including the copolymer and inorganic particle or precursor of the inorganic particle has high heat resistance and excellent optical properties.

The siloxane or silanol group substitutes at least one terminal end of the copolymer forms a cross-linking bond with the inorganic particle or precursor of the inorganic particle through hydrolysis, during the composition is dried and heated. Thereby, a cross-linking bond may be formed between the copolymers, and thus a film made of the copolymer may have improved mechanical strength, heat resistance, and optical properties.

The inorganic particle or a precursor thereof of the composition including a polyimide copolymer and an inorganic particle may be an oxide or hydroxide of at least one element selected from Ti, Si, Al, Zr, Sn, B, and Ce, or a precursor being capable of providing the oxide or hydroxide.

Particularly, the precursor compound being capable of providing the oxide or hydroxide of an element selected from Ti, Si, Al, Zr, Sn, B, or Ce may be an alkoxide, an ester, an acetylacetonate, or a halide of the element, but is not limited thereto.

Particularly, the inorganic particle may be silica ($SiO_2$) or $TiO_2$.

A precursor of the silica may include an organic silica precursor or an inorganic silica precursor, and the organic silica precursor may be a compound represented by following chemical formulae, but is not limited thereto.

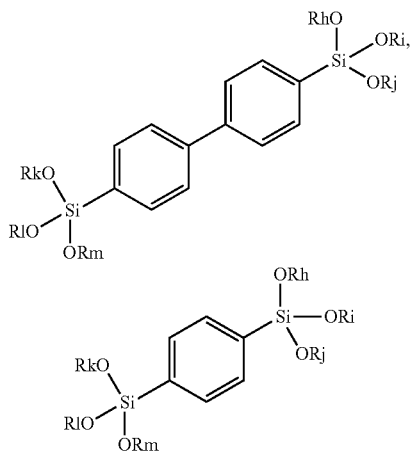

In the above chemical formulae,

Rh to Rm are the same or different, and are independently a C1 to C20 alkyl, a C2 to C20 alkenyl, a C2 to C20 alkynyl, a C3 to C20 cycloalkyl, or a C6 to C18 aryl.

The inorganic silica precursor may include TEOS (tetraethyl orthosilicate), but is not limited thereto.

A precursor of $TiO_2$ may include titanium tetraisopropoxide, but is not limited thereto.

The inorganic particle or precursor of the inorganic particle may be included in an amount so that the inorganic particle is included in an amount of about 5 wt % to about 95 wt % based on the total amount of the copolymer. Specifically, the inorganic particle or precursor may be included in an amount so that the inorganic particle is included in an amount of about 10 wt % to about 90 wt %, and more specifically about 15 wt % to about 80 wt %, based on the total amount of the copolymer.

When the inorganic particle or precursor of inorganic particle is included within the above range, excellent heat resistance and a low CTE (coefficient of thermal expansion) may be implemented while high optical properties are maintained compared with a polyimide copolymer without the inorganic particle or precursor of the inorganic particle.

When the copolymer includes the inorganic particle or a precursor of the inorganic particle, the composition including the copolymer and the inorganic particle or precursor of the inorganic particle may have high mechanical strength and heat resistance, excellent optical properties, a low CTE (coefficient of thermal expansion), and improved workability.

A plastic substrate for a display is required to have high light transmittance, solvent resistance, a low CTE, heat resistance, and the like. Particularly a plastic substrate for an OLED is required to have high heat resistance and colorlessness or transparency at a high temperature since the plastic substrate is exposed at a high temperature of greater than or equal to about 400° C. during fabrication of an oxide thin film transistor (oxide TFT) or a polysilicon thin film transistor (polysilicon TFT).

However, a generally-used polymer may be yellowed when being exposed to a temperature of greater than or equal to about 400° C., and may be inappropriate for a substrate for an OLED. In order to improve optical properties of a generally-used polyimide, a bulky side chain group or a kink structure may be introduced into the polyimide and a fluorine compound may be mixed. However, a CTE may be increased. A polymer including an alicyclic compound may have desirable light transmittance and a low CTE, but it may be discolored by oxidation at a high temperature due to insufficient thermal stability.

On the contrary, the composition including the transparent and colorless polyimide or poly(imide-amide) copolymer described above and the inorganic particle or precursor thereof such as silica or $TiO_2$ has high heat resistance, mechanical strength, and a low CTE due to the inorganic particle or precursor of the inorganic particle. Particularly, the composition in-situ forms a cross-linking bond between the copolymer and inorganic particle or precursor of the inorganic particle during film fabrication, and implements high mechanical strength and heat resistance, as well as excellent optical properties.

As described above, in order to solve phase separation due to highly packing of an inorganic material, a siloxane or silanol group substitutes a terminal end of an oligomer. The resultant siloxane or silanol terminal end forms a cross-linking bond between the inorganic particle or precursor of the inorganic particle and the copolymer, and thus high mechanical strength and heat resistance, as well as excellent optical properties may be realized.

The polyamide copolymer may have total light transmittance of greater than or equal to about 80%, for example greater than or equal to about 90%, in a wavelength range of about 380 nm to about 750 nm, and light transmittance of greater than or equal to about 55%, for example greater than or equal to about 65%, at a wavelength of about 400 nm.

When the polyamide copolymer has light transmittance within the above range, the polyimide copolymer may be used for fabricating an article requiring transparency in various fields, and improved color reproducibility. Specifically, the polyamide copolymer may have total light transmittance of about 80% to about 95% in a wavelength range of about 380 nm to about 750 nm, and light transmittance of about 55% to about 90% at a wavelength of about 400 nm.

The polyimide or poly(imide-amic acid) copolymer in the composition may be a block, random, or alternate copolymer, which is not limited thereto.

Hereinafter, a method of preparing a copolymer, and a method of preparing a composition including the copolymer and inorganic particles or a precursor thereof are described.

When the copolymer includes the first repeating unit and/or the second repeating unit, and the third repeating unit in one embodiment, the copolymer may be prepared by the following method: preparing first monomer having the repeating unit represented by Chemical Formula 1, the repeating unit represented by Chemical Formula 2, or a combination thereof by reacting a diamine and a dicarboxylic acid derivative; preparing second monomers to prepare the first repeating unit including the repeating unit represented by above Chemical Formula 3, or an amic acid repeating unit to form the repeating unit of Chemical Formula 3 through imidization, and/or the second repeating unit including the repeating unit represented by above Chemical Formula 4, or an amic acid repeating unit to form the imide of Chemical Formula 4 through imidization; mixing and copolymerizing the first and the second monomers; and substituting a terminal end of the copolymerized copolymer with a substituted or unsubstituted siloxane or silanol group. In an embodiment, both terminal ends may be independently substituted with the substituted or unsubstituted siloxane or silanol group.

The copolymer according to one embodiment may not have to be prepared according to one specific method, and may be prepared using various methods known by a person having ordinary skills in the related arts.

The third repeating unit is an amide repeating unit, and it may be prepared through a method such as a low-temperature solution polymerization method, an interface polymerization method, a melt polymerization method, and a solid-phase polymerization method, but is not limited thereto.

Among them, a low-temperature solution polymerization method is taken as an example, and a method for preparing the third repeating unit is described. According to the low-temperature solution polymerization method, an amide is prepared by polymerizing carboxylic acid dichloride and diamine in an aprotic polar solvent.

The aprotic polar solvent may include a sulfoxide-based solvent such as dimethylsulfoxide and diethylsulfoxide, a formamide-based solvent such as N,N-dimethyl formamide and N,N-diethylformamide, an acetamide-based solvent such as N,N-dimethylacetamide and N,N-diethylacetamide, a pyrrolidone-based solvent such as N-methyl-2-pyrrolidone and N-vinyl-2-pyrrolidone, a phenol-based solvent such as phenol, o-, m-, or p-cresol, xylenol, halogenated phenol, and catechol, hexamethylphosphoramide, γ-butyrolactone, or a mixture thereof. However, this disclosure is not limited to them, and an aromatic hydrocarbon such as xylene and toluene may be used. Also, to promote the dissolution of a polymer, an alkali metal salt or an alkaline earth metal salt may be further added to the solvent in an amount of about 50 wt % or less based on the total amount of the solvent.

The third repeating unit may be obtained in the aprotic polar solvent by mixing and reacting a diamine, for example a diamine selected from 4,4'-(9-fluorenylidene)dianiline (BAPF), 2,2'-bis(trifluoromethyl)benzidine (TFDB), 4,4'-diaminodiphenyl sulfone (DADPS), bis(4-(4-aminophenoxy)phenyl)sulfone (BAPS), 2,2',5,5'-tetrachlorobenzidine, 2,7-diaminofluorene, 1,1-bis(4-aminophenyl)cyclohexane, 4,4'-methylene-bis(2-methylcyclohexylamine), 4,4-diaminooctafluorobiphenyl, 3,3'-dihydroxybenzidine, 1,3-cyclohexanediamine, and a combination thereof; and carboxylic acid dichloride, for example a carboxylic acid dichloride selected from terephthaloyl chloride (TPCl), isophthaloyl chloride (IPCl), biphenyl dicarbonyl chloride (BPCl), naphthalene dicarbonylchloride, terphenyl dicarbonylchloride, 2-fluoro-terephthaloyl chloride, and a combination thereof. Herein, the kind and amount of the diamine and the carboxylic acid dichloride may be selected appropriately according to a desired composition of the third repeating unit.

Meanwhile, when the third repeating unit is prepared and more diamine is used than the carboxylic acid dichloride, an amine group may be made to exist at a terminal of the third repeating unit.

The first and second repeating units are imide repeating units, and may be prepared by a general process of first preparing amic acid units which are precursors of the first repeating unit or the second repeating unit, and then imidizing the precursors. For example, the first repeating unit or the second repeating unit may be prepared by reacting a tetracarboxylic anhydride with a diamine as monomers so as to form amic acid units, and then imidizing the amic acid through a process such as a thermal solution imidization process or chemical imidization.

For example, the amic acid units that are precursors of the first repeating unit or the second repeating unit may be prepared with a tetracarboxylic anhydride selected from, for example, 2,2-bis-(3,4-dicarboxyphenyl)hexafluoropropane dianhydride (6FDA), 3,3',4,4'-biphenyltetracarboxylic dianhydride (BPDA), benzophenone tetracarboxylic dianhydride (BTDA), bis(3,4-dicarboxyphenyl)sulfone dianhydride, and a combination thereof; and a diamine selected from, for example, 2,2'-bis(trifluoromethyl)benzidine (TFDB), 4,4'-diaminodiphenyl sulfone (DADPS), 4,4'-(9-fluorenylidene)dianiline (BAPF), bis(4-(4-aminophenoxy)phenyl)sulfone (BAPS), 2,2',5,5'-tetrachlorobenzidine, 2,7-diaminofluorene, 1,1-bis(4-aminophenyl)cyclohexane, 4,4'-methylenebis-(2-methylcyclohexylamine), 4,4-diaminooctafluorobiphenyl, 3,3'-dihydroxybenzidine, 1,3-cyclohexanediamine, and a combination thereof.

Herein, the kind and amount of the tetracarboxylic anhydride and the diamine may be appropriately selected according to a desired composition of the above-mentioned first or second repeating unit.

When the precursor of the first or second repeating unit is prepared and more of the diamine is used than the tetracarboxylic anhydride, an amine group may be present at a terminal end of the precursor of the first or second repeating unit.

While the method of preparing the copolymer is described separately for the method of preparing polyamide including the repeating unit represented by Chemical Formula 1 and/or Chemical Formula 2, and for the method of preparing polyimide including repeating unit represented by Chemical Formula 3 and/or Chemical Formula 4, the copolymer according to an embodiment may be prepared by mixing and copolymerizing monomers preparing the repeating units, or by first polymerizing a monomer including the polyamide repeating unit, and then polymerizing monomers for preparing polyimide to be copolymerized to a poly(amide-imide) or poly(amide-amic acid) copolymer.

The prepared copolymer is substituted with a siloxane or silanol group at a terminal end, for example, both terminal ends of the copolymer. That is to say, compounds having a silane or silanol group represented by Chemical Formula 20 are added to the prepared poly(amide-imide) copolymer solution followed by agitating and mixing so as to prepare a poly(amide-imide) copolymer including a siloxane or silanol group substituted at a terminal ends of the copolymer.

The siloxane or silanol group substituted at a terminal end of the copolymer may be obtained by preparing a copolymer, and mixing a solution including the copolymer and a compound including a siloxane or silanol group.

A method of preparing a composition including the poly(amide-imide) copolymer substituted a siloxane or silanol group at a terminal end and the inorganic particle or precursor of the inorganic particle are described.

The poly(amide-imide) copolymer with a substituted siloxane or silanol group at a terminal end is added to a solution including the inorganic particle or precursor of the inorganic particle followed by mixing and agitating, and as a result, a composition including a poly(amide-imide) copolymer with a substituted siloxane or silanol group at a terminal end and inorganic particles or a precursor thereof may be prepared.

The composition may be coated on a substrate followed by drying to form an organic polymer film including inorganic nanoparticles.

A molecular weight of the copolymer according to an embodiment may be adjusted appropriately according to its use, and thus an oligomer or high molecular weight polymer may be obtained.

The oligomer may be appropriate for spin-coating that is used for an OLED substrate, due to low viscosity. As described above, a composition including the polyimide oligomer and inorganic particles is spin-coated on a substrate, and dried to fabricate a transparent substrate film for an OLED. The composition including a polyimide oligomer and inorganic particles according to one embodiment may provide an optical film having sufficient tensile strength and mechanical strength, high heat resistance, a low CTE, and improved transparency since the siloxane or silanol group substituted at a terminal end of the polyimide oligomer in-situ forms a cross-linking bond with the inorganic particle or inorganic particle precursor during film fabrication.

According to another embodiment, an article including a composition including the copolymer and inorganic particles is provided.

The article may be film, a fiber, a coating material, or an adhesive material, but is not limited thereto.

The article may be formed using the composition including a copolymer and an inorganic particle through a dry-wet method, a dry method, or a wet method, but this disclosure is not limited thereto. Particularly, as described above, when the article may be an optical film, the composition including a copolymer and inorganic particles may be spin-coated on a substrate followed by drying and curing to easily fabricate an optical film.

The article may have total light transmittance of greater than or equal to about 70%, for example greater than or equal to about 75%, in a wavelength range of about 360 nm to about 700 nm, and the article may have light transmittance of greater than or equal to about 55%, for example greater than or equal to about 60%, for light of about a 430 nm wavelength. When the light transmittance of the article including a composite including the copolymer and inorganic particle is within the range, the article may have excellent color reproducibility.

Specifically, the article may have total light transmittance of about 75% to about 95% in a wavelength range of about 360 nm to about 750 nm, and may have a light transmittance of about 60% to about 90% for the light of about a 430 nm wavelength.

The article may have a coefficient of thermal expansion (CTE) of about 30 ppm/° C. or lower. When the coefficient of thermal expansion of the article is within the range, the article may have excellent heat resistance. Specifically, the article may have a coefficient of thermal expansion of less than or equal to about 25 ppm/° C. or lower, and more specifically less than or equal to about 20 ppm/° C.

The article may have a glass transition temperature (Tg) of greater than or equal to about 400° C. The composition including the copolymer and inorganic particle according to one embodiment has improved glass transition temperature of greater than or equal to about 400° C. due to the inorganic particle. Such a high glass transition temperature is required for a high temperature process such as OLED fabrication.

The article may have a haze of less than or equal to about 7%. When the haze of the article is within the range, the article may be transparent enough to have excellent clarity. Specifically, the article may have a haze of less than or equal to about 5%, and more specifically less than or equal to about 3%.

The article may have a yellowness index (YI) of less than or equal to about 20%. When the yellowness index (YI) of the article is within the range, the article may be transparent and colorless.

The article, for example a film, may have a thickness of about 0.01 μm to about 1000 μm, but the disclosure is not limited to this and the thickness may be adjusted properly according to its use.

The article may have flexibility of a copolymer while having improved transparency, heat resistance, and mechanical strength, and a low CTE, and accordingly the article may be used for diverse areas, such as a substrate for a device, a substrate for a display device, an optical film, an integrated circuit (IC) package, an adhesive film, a multi-layer flexible printed circuit (FRC), a tape, a touch panel, and a protective film for an optical disk.

Another embodiment provides a display device including the article. The display device may include a liquid crystal display (LCD), an organic light emitting diode (OLED), and the like, but is not limited thereto.

Among the display devices, a liquid crystal display (LCD) is described by referring to FIG. 1. FIG. 1 is a cross-sectional view of a liquid crystal display (LCD) in accordance with an embodiment.

Referring to FIG. 1, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and they face each other with the gate electrode 124 between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the composite including the poly(amide-imide) copolymer and inorganic particles.

Figure 2:
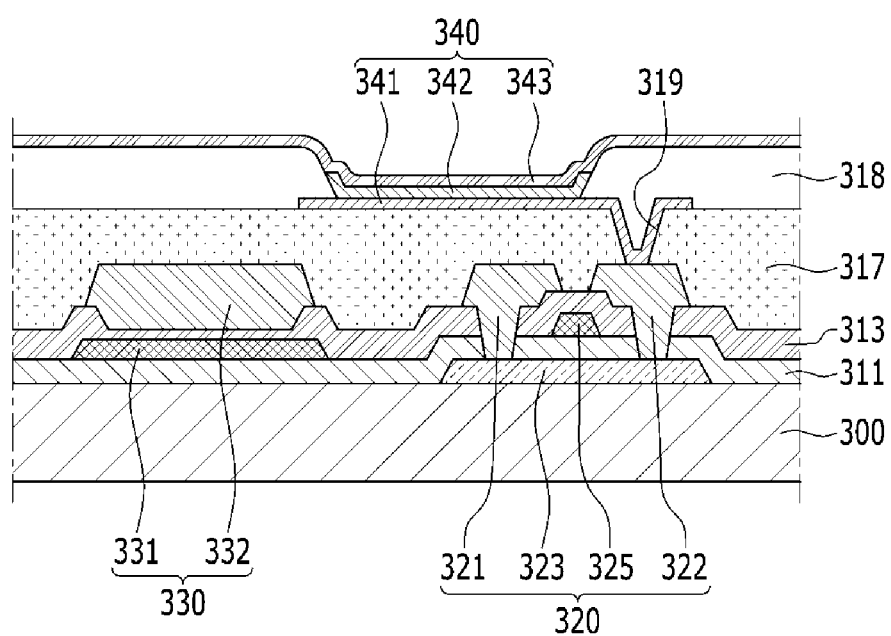
FIG. 2 is a cross-sectional view of an organic light emitting diode ("OLED") in accordance with an embodiment.

Among the display devices, an organic light emitting diode (OLED) is described by referring to FIG. 2. FIG. 2 is a cross-sectional view of an organic light emitting diode (OLED) in accordance with an embodiment.

Referring to FIG. 2, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to one embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and they face each other with the gate electrode 325 between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be formed into an article including the composite including the poly(amide-imide) copolymer and inorganic particles.

Hereafter, the technology of this disclosure is described in detail with reference to examples. The following examples and comparative examples are not restrictive but are illustrative.

EXAMPLES

Synthesis Example 1

Synthesis of Oligo (Amide-Amic Acid) Substituted with Siloxane Group

DA119, including a repeating unit represented by above Chemical Formula 2, is prepared according to following Reaction Scheme 1.

Reaction Scheme 1

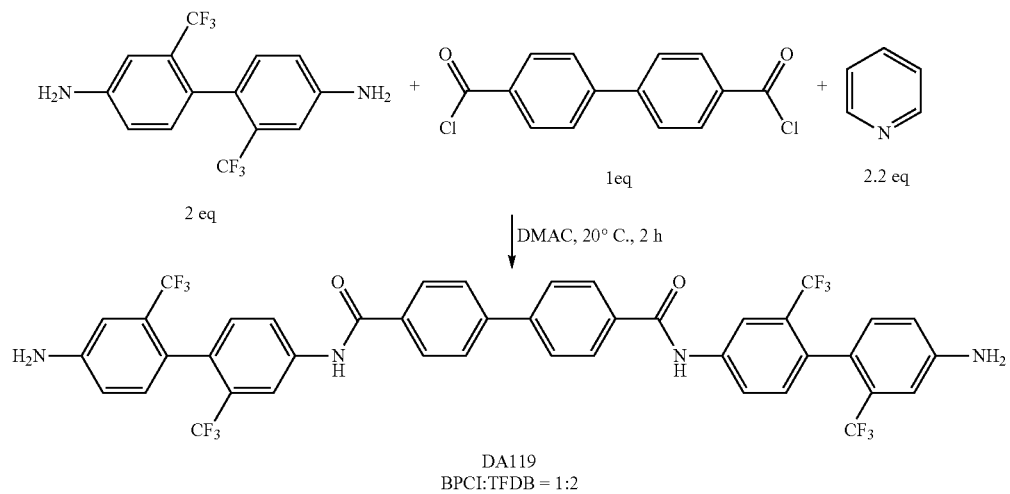

DA119
BPCl:TFDB = 1:2

In other words, the DA119 monomer corresponding to an amide unit is prepared by dissolving 2 mol equivalent (0.08 mol, 25.6192 g) of 2,2'-bis(trifluoromethyl)benzidine (TFDB) and 2.2 mol equivalent (0.088 mol, 6.96 g) of pyridine in 800 g of N,N-dimethylacetamide as a solvent in a round-bottomed flask and washing the TFDB using 80 ml of DMAC. Next, 11.1648 g (1 mol equivalent, 0.04 mol) of BPCl (biphenyl dicarbonyl chloride) is divided into four portions and added one at a time (for a total of four additions) to the TFDB solution at 5° C. The mixture is vigorously agitated for 15 minutes.

The resulting solution is agitated under a nitrogen atmosphere for 2 hours, and then added to 7 L of water including 1 kg of NaCl. The mixture is cooled down to 0° C. The cooled mixture is maintained at 0° C. for 12 hours, completing precipitation of an organic material. The solid precipitate is filtered and then resuspended four times with 1.5 L of deionized water and refiltered. The filtered product is appropriately pressurized to remove as much water as possible therein and dried through a nitrogen stream until it has a constant weight. The pre-dried product is further maintained in vacuum desiccators having sodium hydroxide and nitrogen atmospheres for 36 hours to remove water still remaining therein and dried at 90° C. under vacuum, obtaining the DA119 monomer described in the reaction scheme 1.

Figure 3:
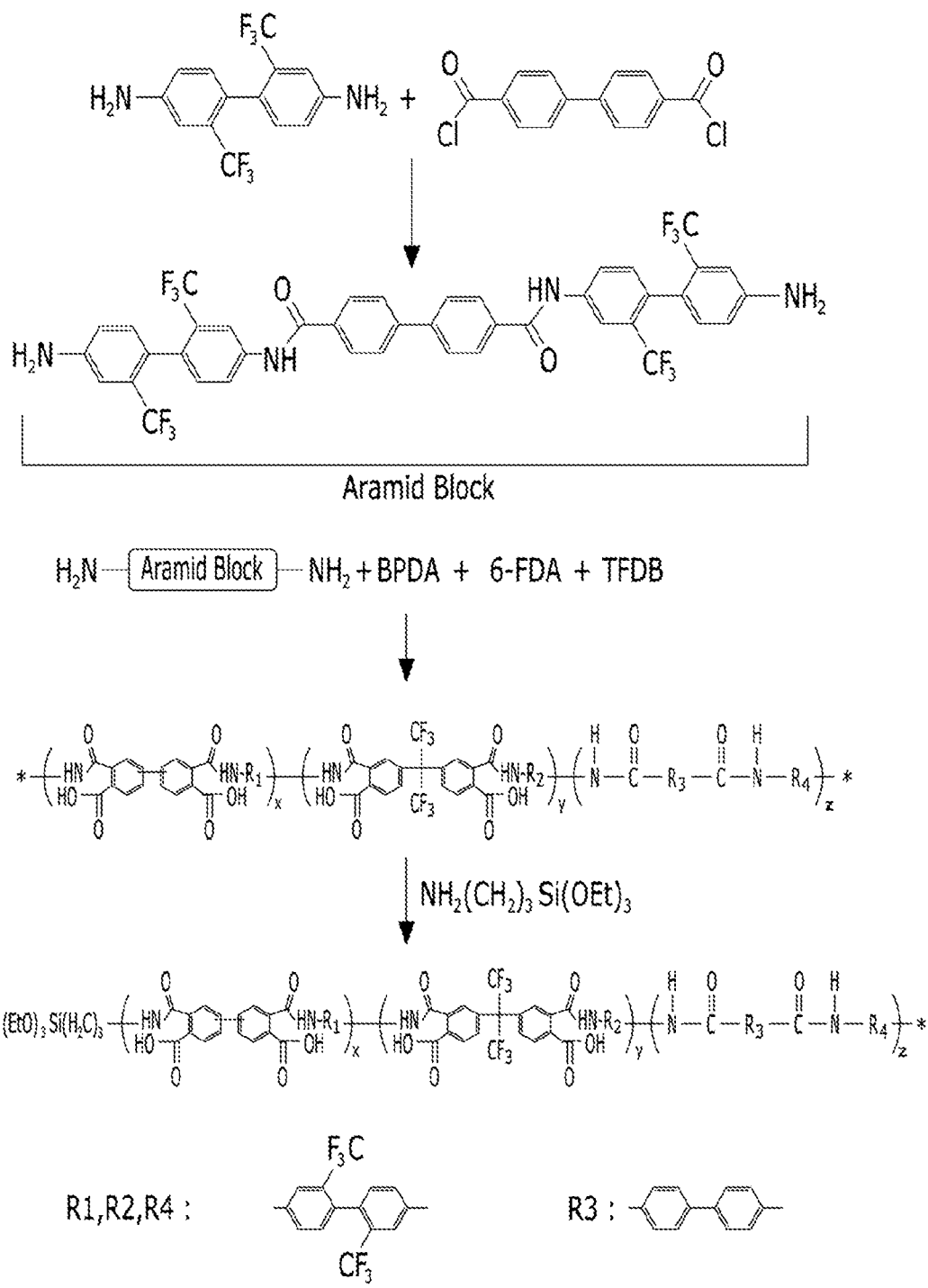
FIG. 3 schematically shows a reaction scheme of preparing a poly(amide-amic acid) copolymer substituted with a silanol group at one terminal end.

4.4051 g (0.0052 mol) of the DA119 and 2.2226 g (0.0069 mol) of TFDB are added to 39.97 g of NMP (N-methyl-2-pyrrolidone) at 80° C. in a 250 ml 4-necked double walled reactor having a mechanical stirrer and a nitrogen inlet, and the mixture is agitated until the DA119 and the TFDB are completely dissolved. The reactant is cooled down to 20° C., and 0.5994 g (0.0013 mol) of 6-FDA (4,4'-hexafluoroisopropylidene)diphthalic anhydride), 3.5729 g (0.0121 mol) of BPDA (3,3'-4,4'-biphenyltetracarboxylic dianhydride), and 9.234 g of NMP are slowly added thereto. The mixture is reacted for 24 hours, obtaining wt % of an oligo(amide-amic acid) solid. Then, 3-aminopropyl triethoxysilane (APS) is slowly added to the resultant. The mixture is slowly reacted for 6 hours, obtaining an oligo (amide-amic acid) (PAD-573) solution substituted with a siloxane group at the end (refer to FIG. 3).

Synthesis Example 2

Figure 4:
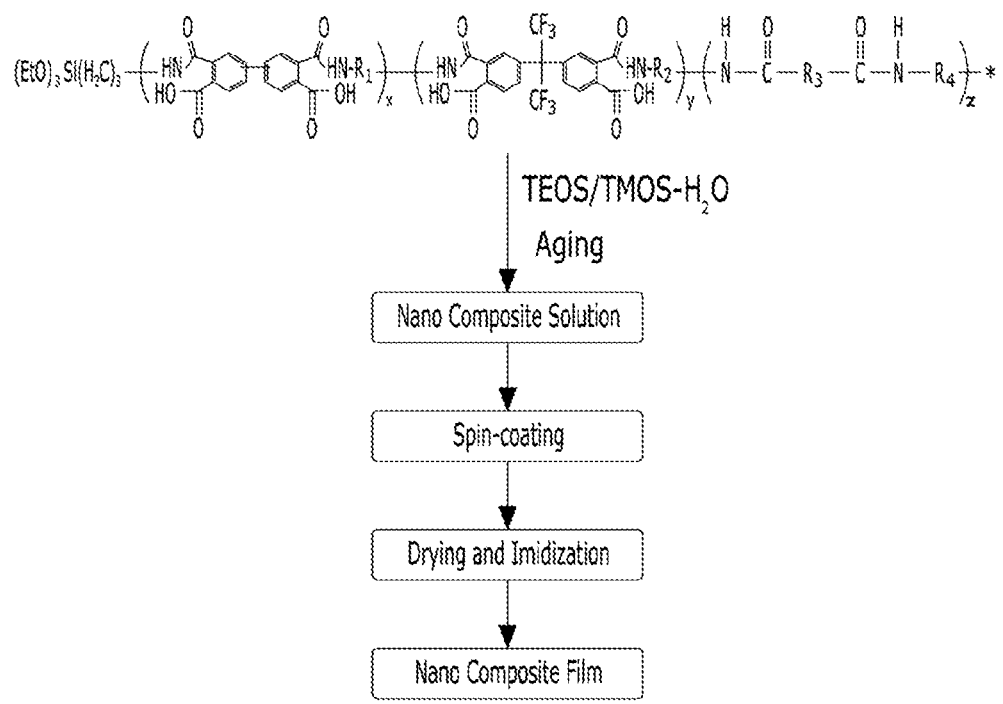
FIG. 4 schematically shows a process of fabricating a nanocomposite film by mixing an inorganic particle precursor with a poly(amide-amic acid) copolymer substituted with a silanol group at one terminal end of the copolymer to prepare a nanocomposite solution, and then spin-coating, drying, and imidizing the nanocomposite solution.

Synthesis of Oligo (Amide-Amic Acid) Substituted with Siloxane Group Silica Nanocomposite and Fabrication of Film Using the Same A process of manufacturing the nanocomposite is briefly described in FIG. 4.

Particularly, 5 g (solid contents of 18 wt %) solution of the oligo(amide-amic acid) PAD-573 substituted with a siloxane group at the end according to Synthesis Example 1 is put in a 20 ml vial. Next, 0.3086 g of TEOS (tetraethyl orthosilicate, Samchun Pure Chemicals, 99%) and 0.1308 g of $H_2O$/NMP (a mixture ratio of 4:6 by weight) are added to the vial. The mixture is agitated for 24 hours and spin-coated on a glass substrate.

On the other hand, 50 wt % and 60 wt % of TMOS (tetramethyl orthosilicate, Aldrich, 99%) based on the solid contents of PAD-573 is used to obtain the high content of silica.

The spin-coating is performed by dripping the mixture on the glass substrate (5×5 cm) and spinning it at a speed of 800 rpm. The spin-coated solution is pre-dried on an 80° C. hot plate for 1 hour to evaporate a surplus solvent therein. The glass substrate is heated at a speed of 3° C./min up to 320° C. under a nitrogen atmosphere and cured at 320° C. for 1 hour.

The film is put in a 400° C. furnace for 30 minutes and tested regarding thermal stability.

The following Table 1 shows theoretical mole compositions of the polyimide-amide (PIA) film with a substituted siloxane group at both terminal ends. PIA10 indicates 10 wt % of a $SiO_2$ theoretical amount, and PIA20 indicates 20 wt % of a $SiO_2$ theoretical amount. The rest of them are interpreted in the same way.

TABLE 1

| Samples | BPCI | TFDB | 6-FDA | BPDA | APS | TEOS | TMOS |
|---|---|---|---|---|---|---|---|
| PIA | 3.33 | 10 | 1 | 9 | — | — | — |
| PIA10 | 6 | 15 | 1 | 9 | 2 | 5 | — |
| PIA20 | 6 | 15 | 1 | 9 | 2 | 15 | — |
| PIA30 | 6 | 15 | 1 | 9 | 2 | 25 | — |
| PIA40 | 6 | 15 | 1 | 9 | 2 | 35 | — |
| PIA50 | 6 | 15 | 1 | 9 | 2 | — | 45 |
| PIA60 | 6 | 15 | 1 | 9 | 2 | — | 55 |

Experimental Example

Performance Evaluation of Film

Experimental Example 1

Light Transmittance

The film is evaluated regarding optical properties using a spectrophotometer (CM2600d, Konica Minolta) in a transmission opacity/haze mode. The spectra of the film are recorded in a wavelength range ranging from 360 nm to 700 nm.

Experimental Example 2

Thermal Expansion Coefficient (CTE) and Glass Transition Temperature (Tg)

CTE is measured using TMA Q400 (TA Instruments, USA) according to the following heating program. Specifically, the CTE measurement takes a second scan value, which is measured at a temperature ranging from 50° C. to 300° C.

First scan condition: maintain the same temperature for 5 minutes then increase the temperature up to 300° C. at a speed of 5° C./min then cool down to 40° C.

Second scan condition: increase a temperature up to 400° C. at a speed of 5° C./min.

Figure 5:
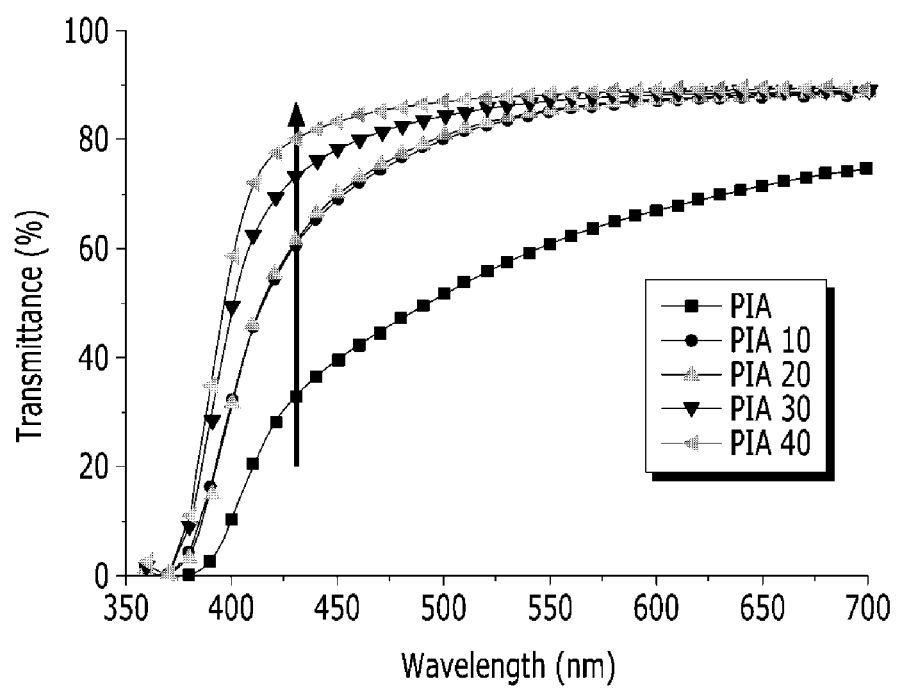
FIG. 5 is a graph showing light transmittance of the nanocomposite film according to Synthesis Example 2 versus wavelength depending on the amounts of silica.
Figure 6:
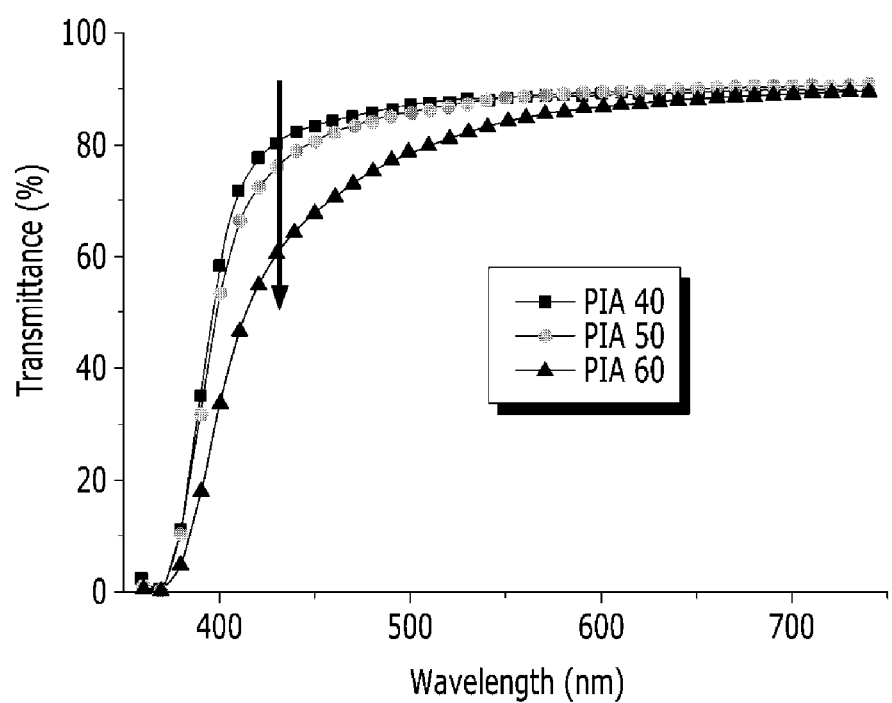
FIG. 6 is a graph showing light transmittance of the nanocomposite film versus wavelength by adjusting the amount of silica to 40 wt %, 50 wt %, and 60 wt %.

FIGS. 5 and 6 show optical properties of the film according to Synthesis Example 2. As shown in FIGS. 5 and 6, the more the silica is included, the higher the light transmittance the film has. However, when silica is included in an amount of greater than or equal to 50 wt % and 60 wt %, the silica is coagulated and thus decreases light transmittance and increases haze to greater than or equal to 7%.

Figure 7:
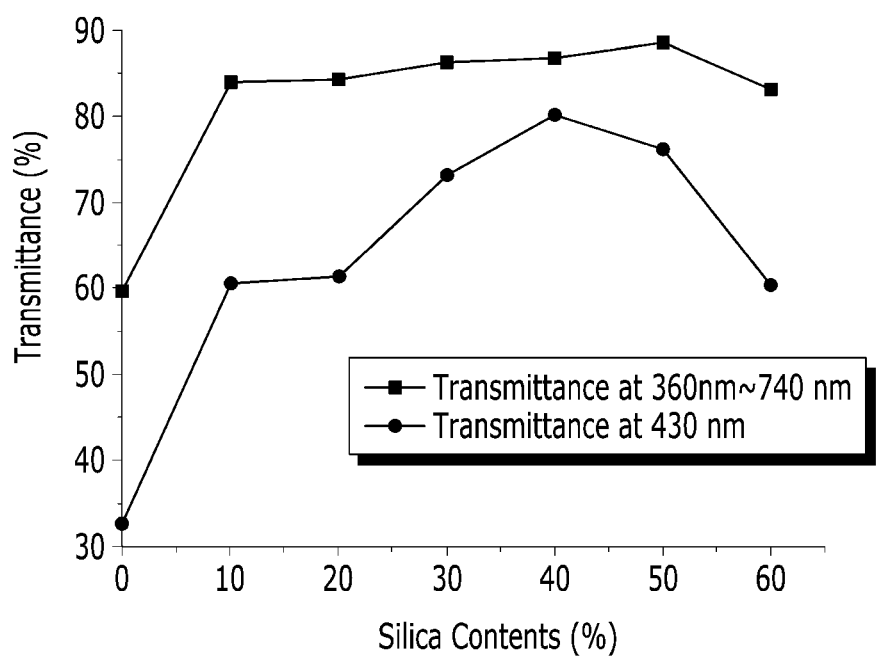
FIG. 7 is a graph showing light transmittance of each nano composite film according to Synthesis Example 2 versus the amount of silica at a wavelength of 430 nm.

FIG. 7 shows light transmittance measured at 430 nm and at the overall wavelength range (i.e., 360 nm to 740 nm) after heating the polymer film at 400° C. for 30 minutes. The PIA nanocomposite film has a higher transmittance than the PIA film, a pure polymer film. In particular, when silica is included in an amount of 40 wt % and 50 wt %, the films respectively have light transmittance of 80.08% and 74.4%.

The following Table 2 shows optical properties depending on the amount of silica included in the films.

TABLE 2

| Samples | Tr, % | Tr 430 nm, % | Haze |
|---|---|---|---|
| PIA | 59.8 | 32.74 | 0.59 |
| PIA10 | 84.05 | 60.61 | 0.83 |
| PIA20 | 84.37 | 61.47 | 0.93 |
| PIA30 | 86.46 | 73.25 | 0.5 |
| PIA40 | 88.08 | 80.08 | 0.61 |
| PIA50 | 87.62 | 74.74 | 2.38 |
| PIA60 | 80.88 | 51.17 | 11.08 |

Experimental Example 3

Thermogravimetric Analysis (TGA)

A nanocomposite is measured regarding thermal stability by taking 10 to 15 mg of a sample in $Al_2O_3$ heated from 25° C. to 600° C. at a speed of 10° C./min under a nitrogen atmosphere (a gas flow rate: 70 ml/min) using a TGA Q500 thermogravimetric analyzer (TA Instruments, USA).

Figure 8:
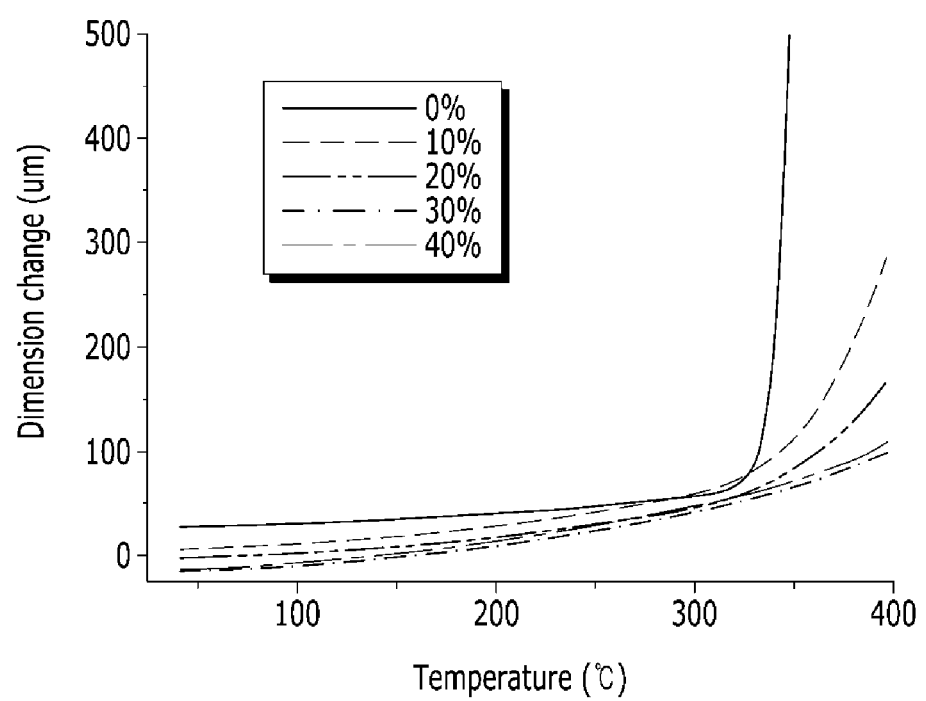
FIG. 8 is a graph showing dimensional changes of each nano composite film according to Synthesis Example 2 versus on temperature.

FIG. 8 is a graph showing TMA change of the film depending on the amount of silica.

As shown in FIG. 8, the pure PIA film has a sharp dimension change at a temperature of greater than or equal to 300° C. However, when silica is more included, the film has a small dimension change even at a high temperature, for example, 400° C.

The following Table 3 shows Td (thermal decomposition temperature), Tg (glass transition temperature), and CTE (coefficient of thermal expansion) measured at a temperature ranging from 50° C. to 300° C.

TABLE 3

| Samples | Td (0.1%) | Tg | CTE |
|---|---|---|---|
| PIA | 404 | 320 | 19.62 |
| PIA10 | 427 | 322 | 26.11 |
| PIA20 | 428 | 324 | 28.20 |
| PIA30 | 429 | 334 | 26.40 |
| PIA40 | 429 | >400 | 19.24 |
| PIA50 | 427 | >400 | 18.27 |
| PIA60 | 426 | >400 | 14.44 |

As shown in the table, a composite film including silica has an average CTE of 14.44~28.20 ppm/° C. at a temperature ranging from 50° C. to 300° C. The silica increases the glass transition temperature of the film up to greater than or equal to 400° C., which is a very important characteristic in a process of manufacturing an optical film such as an OLED. On the other hand, a nanocomposite film has increased Tg due to strong interaction between the organic polymer and inorganic particles when an organic polymer chain is cross-linked with silica particles.

Experimental Example 4

Refractive Index and Silica Content

The nanocomposite film is measured regarding refractive index at 633 nm by using a prism coupler Metricon MODEL 2010/M. In addition, the silica content of the nanocomposite film is calculated according to a Lorentz-Lorentz formula represented by the following Equation 1.

$$\frac{n^2-1}{n^2+2} = \frac{n_s^2-1}{n_s^2+2}*\vartheta_s + \frac{n_p^2-1}{n_p^2+2}*\vartheta_p \quad \text{(Equation 1)}$$

In above Equation 1, n, $n_s$, and $n_p$ are refractive indexes of a composite, silica, and a pure polymer, and vs and vp are volume fractions of silica and a pure polymer.

Therefore, a composition including a copolymer and an inorganic particle according to the present invention maintains the flexibility characteristic of PIA and has high heat resistance, mechanical strength, and transparency due to the inorganic particle but low CTE, and accordingly, may be appropriately used as a material for a substrate and the like for a flexible OLED display requiring a high temperature process of greater than or equal to 400° C.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition comprising:
   a copolymer comprising:
      an imide and/or an amic acid structural unit, wherein the imide and/or an amic acid structural unit comprises at least one selected from a first structural unit and a second structural unit,
      wherein the first structural unit comprises an imide structural unit represented by Chemical Formula 3, and/or an amic acid structural unit to form the imide of Chemical Formula 3 through imidization, and
      wherein the second structural unit comprises an imide structural unit represented by Chemical Formula 4, and/or an amic acid structural unit to form the imide of Chemical Formula 4 through imidization; and
   an amide structural unit, wherein the amide unit comprises at least one selected from a third structural unit and a fourth structural unit,
      wherein the third structural unit comprises a structural unit represented by Chemical Formula 1 and
      wherein the fourth structural unit comprises a structural unit represented by Chemical Formula 2,
   wherein at least one end of the copolymer comprises a siloxane or silanol group as a terminal group; and
   an inorganic oxide or hydroxide particle or a precursor compound capable of providing the inorganic oxide or hydroxide particle:

Chemical Formula 3

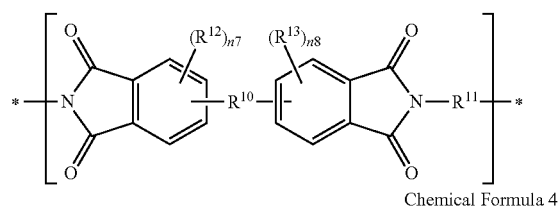

Chemical Formula 4

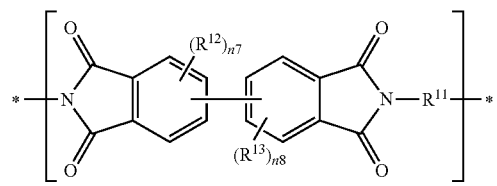

wherein in Chemical Formulae 3 or 4, $R^{10}$ is the same or different in each structural unit, and is independently $C(CF_3)_2$, a C3 to C30 alicyclic organic group, a C6 to C30 aromatic organic group, or a C2 to C30 heterocyclic group, $R^{11}$ is the same or different in each structural unit, and is independently a substituted or unsubstituted C6 to C30 aromatic organic group, wherein the C6 to C30 aromatic organic group is one aromatic ring, two or more aromatic rings fused together to provide a condensed ring system, or two or more moieties independently selected from the foregoing linked through a functional group selected from a single bond, a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, and wherein the substituted C6 to C30 aromatic organic group comprises a C6 to C30 aromatic organic group substituted with at least one electron withdrawing group selected from —CF$_3$, —CCl$_3$, —CBr$_3$—, CI$_3$—, —F—, —Cl—, —Br—, —I—, —NO$_2$—, —CN—, —COCH$_3$, and —CO$_2$C$_2$H$_5$, $R^{12}$ and $R^{13}$ are the same or different, and are independently a halogen, a hydroxy group, a C1 to C10 aliphatic organic group, a C6 to C20 aromatic organic group, an alkoxy group of formula —OR$^{208}$ (wherein R$^{208}$ is a C1 to C10 aliphatic organic group), or a silyl group of formula —SiR$^{209}$R$^{210}$R$^{211}$ (wherein R$^{209}$, R$^{210}$, and R$^{211}$ are the same or different, and are independently hydrogen or a C1 to C10 aliphatic organic group), and n7 and n8 are each independently integers ranging from 0 to 3;

Chemical Formula 1

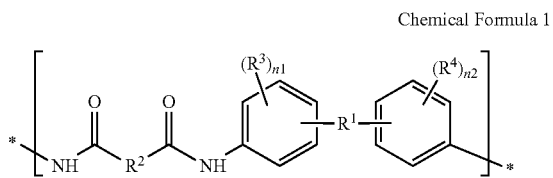

wherein in Chemical Formula 1, $R^1$ is the same or different in each structural unit, and is independently a C3 to C30 alicyclic organic group, a C6 to C30 aromatic organic group, or a C2 to C30 heterocyclic group, $R^2$ is

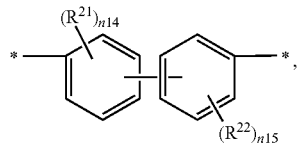

wherein $R^{21}$ and $R^{22}$ are the same or different, and are independently deuterium, a halogen, a C1 to C10 aliphatic organic group, or a C6 to C20 aromatic organic group, and n14 and n15 are independently integers ranging from 0 to 4, $R^3$ and $R^4$ are the same or different and are independently a halogen, a hydroxy group, a C1 to C10 aliphatic organic group, a C6 to C20 aromatic organic group, an alkoxy group of formula —$OR^{200}$ (wherein $R^{200}$ is a C1 to C10 aliphatic organic group), or a silyl group of formula —$SiR^{201}R^{202}R^{203}$ (wherein $R^{201}$, $R^{202}$, and $R^{203}$ are the same or different, and are independently hydrogen or a C1 to C10 aliphatic organic group), and n1 and n2 are independently integers ranging from 0 to 4, Chemical Formula 2

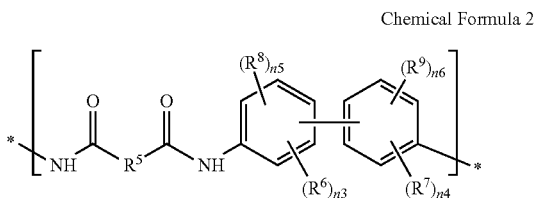

wherein in Chemical Formula 2, $R^5$ is the same as $R^2$, $R^6$ and $R^7$ are the same or different and are independently —$CF_3$, —$CCl_3$, —$CBr_3$, —$CI_3$, —F, —Cl, —Br, —I, —$NO_2$, —CN, —$COCH_3$, or —$CO_2C_2H_5$, $R^8$ and $R^9$ are the same or different, and are independently, a halogen, a hydroxy group, a C1 to C10 aliphatic organic group, a C6 to C20 aromatic organic group, an alkoxy group of formula —$OR^{204}$ (wherein $R^{204}$ is a C1 to C10 aliphatic organic group), or a silyl group of formula —$SiR^{205}R^{206}R^{207}$ (wherein $R^{205}$, $R^{206}$, and $R^{207}$ are the same or different, and are independently hydrogen, a C1 to C10 aliphatic organic group), n3 is an integer ranging from 1 to 4, n5 is an integer ranging from 0 to 3, n3+n5 is an integer ranging from 1 to 4, n4 is an integer ranging from 1 to 4, n6 is an integer ranging from 0 to 3, and n4+n6 is an integer ranging from 1 to 4.

2. The composition of claim 1, wherein the copolymer includes the first structural unit, the second structural unit, and at least one selected from the third structural unit and the fourth structural unit.

3. The composition of claim 2, wherein the total amount of the first structural unit and the second structural unit and the total amount of the third structural unit and/or the fourth structural unit are present in a mole ratio of about 95:5 to about 5:95.

4. The composition of claim 1, wherein the structural unit represented by Chemical Formula 3 comprises a structural unit represented by Chemical Formula 5, or an amic acid structural unit to form the structural unit of Chemical Formula 5 through imidization:

Chemical Formula 5

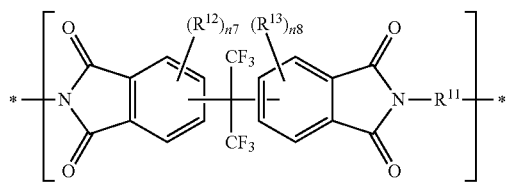

wherein in Chemical Formula 5, $R^{11}$, $R^{12}$, $R^{13}$, n7, and n8 are the same as described in claim 1.

5. The composition of claim 1, wherein in Chemical Formula 1, $R^1$ is selected from the chemical formulae:

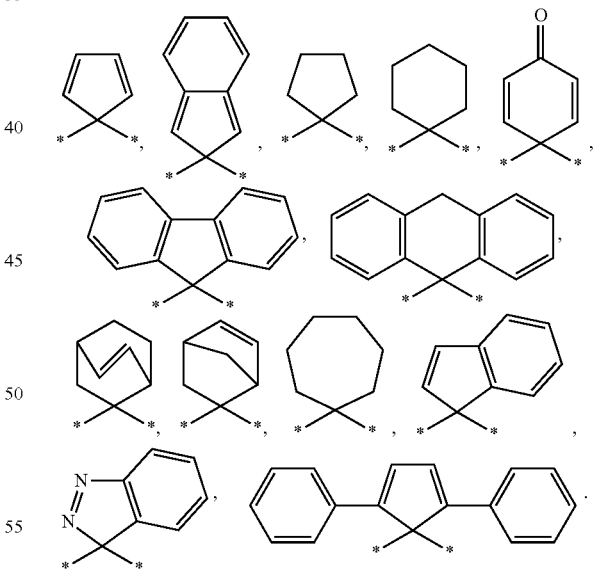

6. The composition of claim 1, wherein $R^2$ and $R^5$ are independently selected from the chemical formula:

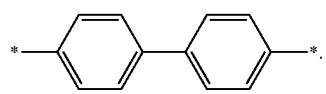

7. The composition of claim 1, wherein the amide structural unit further comprises a fifth structural unit represented by Chemical Formula 6:

Chemical Formula 6

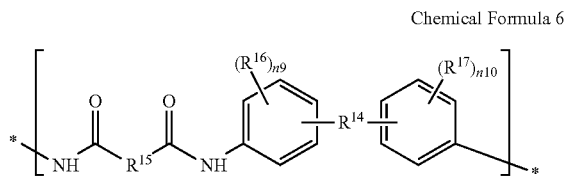

wherein in Chemical Formula 6, $R^{14}$ is the same or different in each structural unit, and independently includes O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq p \leq 10$, (CF$_2$)$_q$ wherein $1 \leq q \leq 10$, C(CH$_3$)$_2$, C(CF$_3$)$_2$, or C(=O)NH, $R^{15}$ is the same as $R^2$, $R^{16}$ and $R^{17}$ are the same or different, and are independently a halogen, a hydroxy group, a C1 to C10 aliphatic organic group, or a C6 to C20 aromatic organic group, an alkoxy group (—OR$^{212}$, wherein $R^{212}$ is a C1 to C10 aliphatic organic group), or a silyl group (—SiR$^{213}$R$^{214}$R$^{215}$, wherein $R^{213}$, $R^{214}$, and $R^{215}$ are the same or different and are independently hydrogen or a C1 to C10 aliphatic organic group), and n9 and n10 are each independently integers ranging from 0 to 4.

8. The composition of claim 7, wherein
the structural unit represented by Chemical Formula 1 comprises a structural unit represented by Chemical Formula 7,
the structural unit represented by Chemical Formula 2 comprises a structural unit represented by Chemical Formula 10,
the structural unit represented by Chemical Formula 3 comprises a structural unit represented by Chemical Formula 13,
the structural unit represented by Chemical Formula 4 comprises a structural unit represented by Chemical Formula 14, and
the structural unit represented by Chemical Formula 6 comprises a structural unit represented by Chemical Formula 15:

Chemical Formula 7

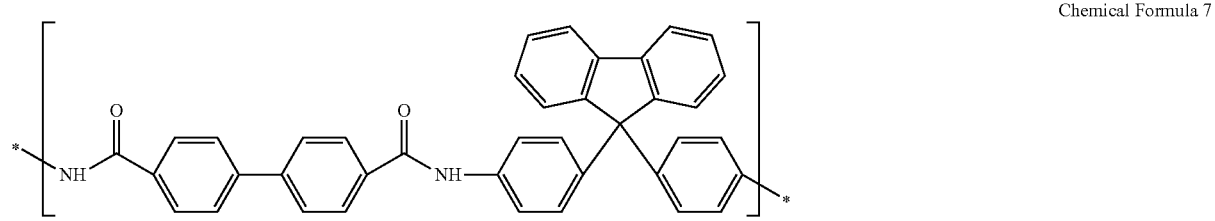

Chemical Formula 10

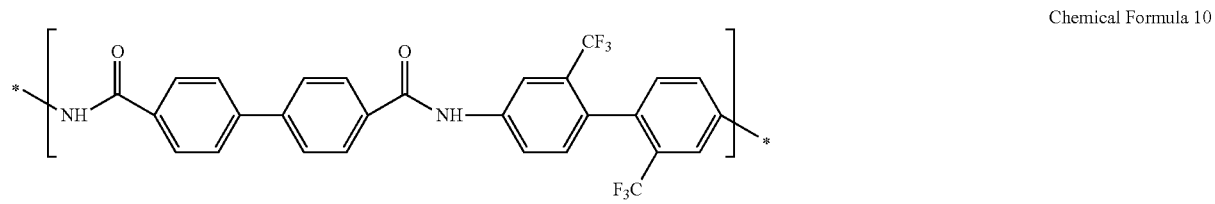

Chemical Formula 13            Chemical Formula 14

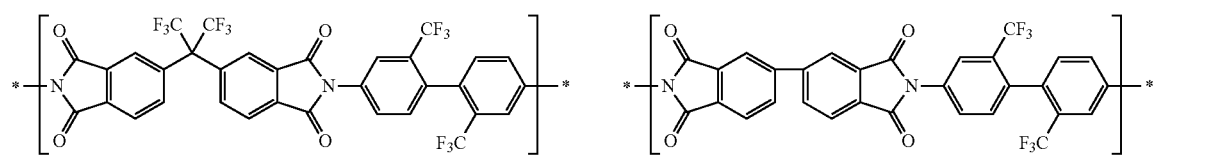

Chemical Formula 15

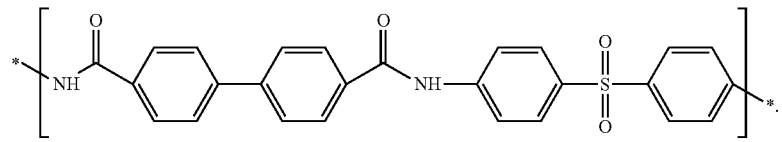

9. The composition of claim 1,
wherein the amide structural unit comprises the fourth structural unit represented by Chemical Formula 2, wherein the Chemical Formula 2 is represented by Chemical Formula 10,
wherein the imide and/or the amic acid structural unit comprises the first structural unit represented by Chemical Formula 3 and the second structural unit represented by Chemical Formula 4, wherein the Chemical Formula 3 is represented by Chemical Formula 13, and the Chemical Formula 4 is represented by Chemical Formula 14:

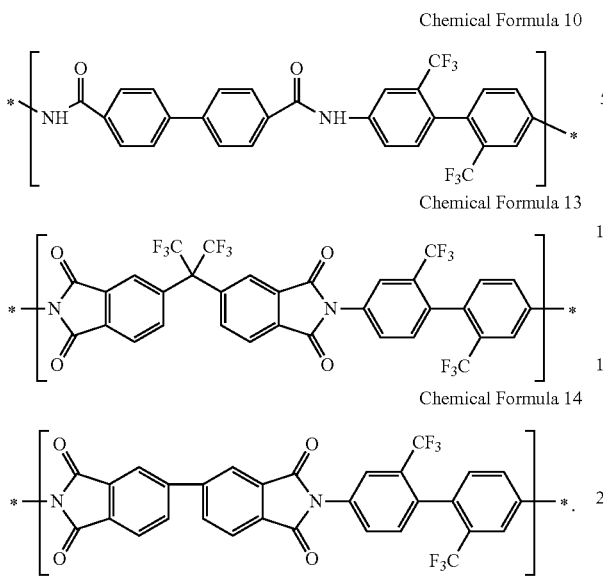

10. The composition of claim 1, wherein the siloxane or silanol group is represented by Chemical Formula 20:

wherein in Chemical Formula 20,
Ra is a C1 to C20 alkylene, a C2 to C20 alkenylene, a C2 to C20 alkynylene, a C3 to C20 cycloalkylene, a C3 to C20 cycloalkenylene, a C3 to C20 cycloalkynylene, a C6 to C18 arylene, or a C6 to C18 arylalkylene, and
Rb to Rd are the same or different and are independently hydrogen, a C1 to C20 alkyl, a C1 to C20 alkenyl, a C1 to C20 alkynyl, a C3 to C20 cycloalkyl, or a C6 to C18 aryl.

11. The composition of claim 10, wherein Chemical Formula 20 is selected from the chemical formulae:

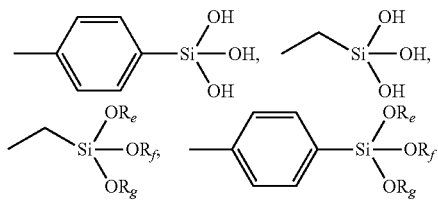

wherein in the above chemical formulae,
Re to Rg are the same or different, and are independently a C1 to C20 alkyl, a C2 to C20 alkenyl, a C2 to C20 alkynyl, a C3 to C20 cycloalkyl, or a C6 to C18 aryl.

12. The composition of claim 1, wherein the inorganic oxide or hydroxide particle or a precursor compound capable of providing the inorganic oxide or hydroxide particle comprises at least one element selected from Ti, Si, Al, Zr, Sn, B, and Ce.

13. The composition of claim 1, wherein the inorganic oxide or hydroxide particle is silica or TiO$_2$, or a precursor compound capable of providing silica or TiO$_2$.

14. The composition of claim 13, wherein the precursor compound capable of providing silica comprises tetraethyl orthosilicate or a compound represented by the following chemical formulae:

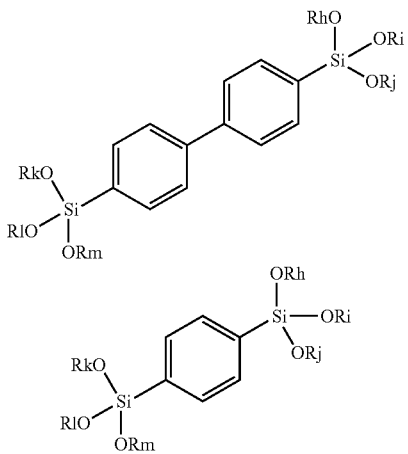

wherein in the above chemical formulae,
Rh to Rm are the same or different, and are independently a C1 to C20 alkyl, a C2 to C20 alkenyl, a C2 to C20 alkynyl, a C3 to C20 cycloalkyl, or a C6 to C18 aryl.

15. The composition of claim 1, which comprises titanium tetraisopropoxide as the precursor capable of providing the inorganic particle.

16. The composition of claim 1, wherein the amount of the inorganic oxide or hydroxide particle or a precursor compound capable of providing the inorganic oxide or hydroxide particle is about 5 wt % to about 95 wt % based on the total amount of the copolymer.

17. An article comprising the composition according to claim 1.

18. A display device comprising the article according to claim 17.

* * * * *